US011739240B2

(12) United States Patent
Collias et al.

(10) Patent No.: US 11,739,240 B2
(45) Date of Patent: Aug. 29, 2023

(54) SUPER ABSORBENT POLYMER RECYCLING TO PRESSURE SENSITIVE ADHESIVES

(71) Applicants: The Regents of the University of Michigan, Ann Arbor, MI (US); The Procter & Gamble Company, Cincinnati, OH (US)

(72) Inventors: Dimitris Ioannis Collias, Cincinnati, OH (US); Paul Zimmerman, Ann Arbor, MI (US); Paul Takunda Chazovachii, Ann Arbor, MI (US); Michael Robo, Ann Arbor, MI (US); Anne McNeil, Ann Arbor, MI (US); Neil Marsh, Ann Arbor, MI (US); Martin Ian James, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 295 days.

(21) Appl. No.: 17/001,345

(22) Filed: Aug. 24, 2020

(65) Prior Publication Data

US 2021/0054248 A1 Feb. 25, 2021

Related U.S. Application Data

(60) Provisional application No. 62/947,363, filed on Dec. 12, 2019, provisional application No. 62/890,943, filed on Aug. 23, 2019.

(51) Int. Cl.
| | | |
|---|---|---|
| *C08J 11/16* | (2006.01) | |
| *C09J 133/08* | (2006.01) | |
| *C08F 20/12* | (2006.01) | |
| *C08F 8/14* | (2006.01) | |
| *C08F 8/18* | (2006.01) | |

(52) U.S. Cl.
CPC ............. *C09J 133/08* (2013.01); *C08F 8/14* (2013.01); *C08F 8/18* (2013.01); *C08F 20/12* (2013.01); *C08J 11/16* (2013.01); *C08J 2333/08* (2013.01)

(58) Field of Classification Search
CPC ...... Y02W 30/62; C09J 133/00; C09J 133/08; C09J 133/10; C09J 133/12; C08F 8/14; C08J 11/10
See application file for complete search history.

(56) References Cited

U.S. PATENT DOCUMENTS

| | | | | | |
|---|---|---|---|---|---|
| 3,677,788 | A | * | 7/1972 | Zirnite | A61F 13/0283 162/146 |
| 7,291,679 | B2 | * | 11/2007 | Maehara | C08F 8/32 525/379 |
| 2003/0114621 | A1 | * | 6/2003 | Kasahara | A61L 24/06 526/317.1 |
| 2010/0099781 | A1 | | 4/2010 | Tian et al. | |
| 2010/0204068 | A1 | * | 8/2010 | Kesavan | C09K 8/88 507/225 |
| 2012/0302445 | A1 | * | 11/2012 | Rudolph | C08F 2/44 504/358 |
| 2014/0230322 | A1 | * | 8/2014 | Zhang | A01G 24/35 47/32.7 |
| 2020/0149220 | A1 | * | 5/2020 | Konishi | D21B 1/32 |
| 2021/0054161 | A1 | | 2/2021 | Collias et al. | |
| 2021/0054248 | A1 | | 2/2021 | Collias et al. | |

FOREIGN PATENT DOCUMENTS

EP 3238840 A1 * 11/2017 ............... B09B 3/00
JP H09249711 A 9/1997

OTHER PUBLICATIONS

All Office Actions; U.S. Appl. No. 18/070,525, filed Nov. 29, 2022.
All Office Actions; U.S. Appl. No. 17/001,338, filed Aug. 24, 2020.
Ebrahimi et al. "The study of ultrasonic degradation of superabsorbent Hydrogels", Organic Chemistry International, vol. 2012, Article ID 343768, Hindawi Publishing Corporation, Year 2012, 5 pages.
Ebrahimi, "Influence of ultrasonic parameters on the Degradation of Acrylic acid/ Acrylamide copolymers based supreabsorbent Hydrogels cross linked with NMBA", Iran polymer J, vol. 21, No. 1, Year 2012, pp. 11-20.
Unpublished U.S. Appl. No. 18/070,525, filed Nov. 29, 2022, to Dimitris Ioannis Collias et al.

* cited by examiner

*Primary Examiner* — Robert C Boyle
(74) *Attorney, Agent, or Firm* — James E. Oehlenschlager

(57) ABSTRACT

Methods for upcycling crosslinked sodium polyacrylate to pressure sensitive adhesives via (a) mechanochemical chain-shortening and esterification or (b) esterifying with high conversion with a Fischer esterification process are disclosed. Also disclosed is a pressure sensitive adhesive prepared by the disclosed methods and articles comprising the pressure sensitive adhesive, including, but not limited to, pressure sensitive tape, a bandage, a label, note pads, a decal, a stamp, an envelope, a sticker, packaging, automobile trim, and a film.

19 Claims, 35 Drawing Sheets

SUPER ABSORBENT POLYMER RECYCLING TO PRESSURE SENSITIVE ADHESIVES

CROSS REFERENCE TO RELATED APPLICATIONS

This application claims priority to United States provisional patent application Ser. Nos. 62/890,943, filed Aug. 23, 2019, and 62/947,363, filed Dec. 12, 2019, each of which is incorporated herein by reference in its entirety.

BACKGROUND

Sodium polyacrylate-based superabsorbent polymers (SAP) are used in a variety of common consumer products, including, but not limited to, disposable personal hygiene products, such as baby diapers, adult incontinence products, and feminine hygiene products. Because SAPs are used predominately in disposable articles, a high percentage of SAPs are disposed of in landfills. Thus, to reduce the impact of SAPs on the environment, methods to recycle or "upcycle" SAPs are desired.

SUMMARY

In some aspects, the presently disclosed subject matter provides a method for preparing a pressure sensitive adhesive from one or more sodium polyacrylate-based superabsorbent polymers, the method comprising: (a) providing a solution comprising one or more sodium polyacrylate-based superabsorbent polymers; (b) decrosslinking the one or more sodium polyacrylate-based superabsorbent polymers to provide one or more decrosslinked sodium polyacrylate-based superabsorbent polymers; (c) optionally sonicating the one or more decrosslinked sodium polyacrylate-based superabsorbent polymers to provide one or more chain-shortened sodium polyacrylate-based superabsorbent polymers; (d) protonating the one or more decrosslinked and/or chain-shortened sodium polyacrylate-based superabsorbent polymers to provide one or more protonated decrosslinked and/or chain-shortened polyacrylic acid-based superabsorbent polymers; and (e) esterifying the one or more protonated decrosslinked and/or chain-shortened polyacrylic acid-based superabsorbent polymers to provide a pressure sensitive adhesive.

In particular aspects, the one or more sodium polyacrylate-based superabsorbent polymers are derived from a disposable personal hygiene product. In more particular aspects, the disposable personal hygiene product is selected from the group consisting of a baby diaper, an adult incontinence product, and a feminine hygiene product.

In certain aspects of the presently disclosed method, the decrosslinking of the one or more sodium polyacrylate-based superabsorbent polymers comprises contacting the one or more sodium polyacrylate-based superabsorbent polymers with a base to provide one or more decrosslinked sodium polyacrylate-based superabsorbent polymers. In more certain aspects, the base is an inorganic base. In even more certain aspects, the inorganic base is selected from the group consisting of NaOH, KOH, $Na_2CO_3$, and $K_2CO_3$.

In some aspects, the presently disclosed method further comprises removing the base from the one or more decrosslinked sodium polyacrylate-based superabsorbent polymers. In particular aspects, the removing of the base from the one or more decrosslinked sodium polyacrylate-based superabsorbent polymers comprises dialyzing the one or more decrosslinked sodium polyacrylate-based superabsorbent polymers using a molecular porous membrane tubing.

In some aspects of the presently disclosed method, the decrosslinking of the one or more sodium polyacrylate-based superabsorbent polymers comprises decrosslinking the one or more sodium polyacrylate-based superabsorbent polymers.

In some aspects, the presently disclosed method further comprises removing residual crosslinked sodium polyacrylate-based superabsorbent polymers from filtering the one or more decrosslinked sodium polyacrylate-based superabsorbent polymers by one or more methods selected from the group consisting of filtration, centrifugation, and decantation.

In particular aspects of the presently disclosed method, the protonating of the one or more decrosslinked sodium polyacrylate-based superabsorbent polymers comprises contacting the one or more decrosslinked sodium polyacrylate-based superabsorbent polymers with a cation exchange resin to provide one or more protonated polyacrylic acid-based superabsorbent polymers. In more particular aspects, the cation exchange resin comprises a sulfonic acid functional group. In other aspects, the protonating of the one or more decrosslinked sodium polyacrylate-based superabsorbent polymers comprises titrating the one or more decrosslinked sodium polyacrylate-based superabsorbent polymers with HCL or $H_2SO_4$ to provide one or more protonated polyacrylic acid-based superabsorbent polymers.

In certain aspects of the presently disclosed method, the esterifying of the one or more protonated polyacrylic acid-based superabsorbent polymers comprises contacting the one or more protonated polyacrylic acid-based superabsorbent polymers with one or more organohalide compounds. In more certain aspects, the one or more organohalide compounds comprises a primary or a secondary organohalide compound. In yet more certain aspects, the primary or secondary organohalide compound comprises at least one halogen atom selected from the group consisting of Cl, Br, and I. In even more certain aspects, the primary or secondary organohalide compound comprises a $C_1$-$C_{12}$ straight-chain or branched alkyl group. Representative $C_1$-$C_{12}$ alkyl groups include, but are not limited to, methyl, ethyl, n-propyl, isopropyl, n-butyl, isobutyl, sec-butyl, tert-butyl, n-pentyl, sec-pentyl, isopentyl, neopentyl, n-hexyl, sec-hexyl, n-heptyl, n-octyl, n-nonyl, n-decyl, undecyl, and dodecyl, and the like.

In particular aspects, the one or more organohalide compound is selected from the group consisting of methyl iodide, ethyl iodide, n-butyl bromide, n-octyl bromide, propargyl bromide (3-bromo-1-propyne), ethyl bromoacetate, ethyl chloroacetate, (1-bromoethyl)benzene, benzyl chloride, benzyl bromide, isobutenyl chloride (3-chloro-2-methylprop-1-ene), 2-ethylhexylbromide, and 2-ethylhexylchloride. In other embodiments, the organohalide is a protected organohalide including, but not limited to, 2-(Boc-amino) ethyl bromide.

In some aspects, the one or more organohalide compounds comprises a protecting group to provide one or more protected esterified protonated polyacrylic acid-based superabsorbent polymers. In particular aspects, the protecting group is selected from the group consisting of tert-butoxycarbonyl (BOC), 9-fluorenylmethoxycarbonyl (FMOC), and the like. In such aspects, the presently disclosed method further comprises deprotecting the one or more protected esterified protonated polyacrylic acid-based superabsorbent polymers.

In some aspects of the presently disclosed method, the esterifying of the one or more protonated polyacrylic acid-based superabsorbent polymers comprises contacting the one or more protonated polyacrylic acid-based superabsorbent polymers with one or more promoters. In certain aspects, the one or more promoters is selected from the group consisting of 1,1,3,3-tetramethylguanidine (TMG), triethylamine, and pyridine.

In some aspects of the presently disclosed method, the esterifying of the one or more protonated polyacrylic acid-based superabsorbent polymers is done in a polar aprotic solvent. In certain aspects, the polar aprotic solvent is selected from the group consisting of dimethyl sulfoxide (DMSO) and N,N-dimethylformamide (DMF).

In other aspects, the presently disclosed subject matter provides a pressure sensitive adhesive prepared by the presently disclosed methods.

In yet other aspects, the presently disclosed subject matter provides an article comprising a pressure sensitive adhesive prepared by the presently disclosed methods. In certain aspects, the article is selected from the group consisting of pressure sensitive tape, a bandage, a label, note pads, a decal, a stamp, an envelope, a sticker, packaging, automobile trim, and a film.

In some aspects, the presently disclosed subject matter provides a method for preparing a pressure sensitive adhesive from one or more sodium polyacrylate-based superabsorbent polymers, the method comprising: (a) providing one or more sodium polyacrylate-based superabsorbent polymers; and (b) contacting the one or more sodium polyacrylate-based superabsorbent polymers with one or more alcohols in the presence of an acid for a period of time at a predetermined temperature to provide a pressure sensitive adhesive.

In certain aspects, the one or more alcohols is selected from the group consisting of 2-ethylhexanol, 3-bromopropanol, and combinations thereof. In particular aspects, the one or more alcohols is 2-ethylhexanol.

In certain aspects, the acid is selected from the group consisting of tosylic acid and sulfuric acid.

In certain aspects, the one or more alcohols is present in about a 1:2 ratio relative to an acrylic acid repeat unit of the one or more sodium polyacrylate-based superabsorbent polymers. In certain aspects, the one or more alcohols is present in about a 1:1 ratio relative to an amount of water.

In particular aspects, the predetermined temperature is about 120° C. In particular aspects, the period of time is about three hours.

In more particular aspects, the method does not require a step of removing water. In even yet more particular aspects, the method is performed in a pressure vessel.

In particular aspects, the one or more sodium polyacrylate-based superabsorbent polymers are derived from a disposable personal hygiene product. In more particular aspects, the disposable personal hygiene product is selected from the group consisting of a baby diaper, an adult incontinence product, and a feminine hygiene product.

In other aspects, the presently disclosed subject matter provides a pressure sensitive adhesive prepared by the presently disclosed methods.

In yet other aspects, the presently disclosed subject matter provides an article comprising a pressure sensitive adhesive prepared by the presently disclosed methods. In certain aspects, the article is selected from the group consisting of pressure sensitive tape, a bandage, a label, note pads, a decal, a stamp, an envelope, a sticker, packaging, automobile trim, and a film.

Certain aspects of the presently disclosed subject matter having been stated hereinabove, which are addressed in whole or in part by the presently disclosed subject matter, other aspects will become evident as the description proceeds when taken in connection with the accompanying Examples and Figures as best described herein below.

BRIEF DESCRIPTION OF THE FIGURES

Figure 1:
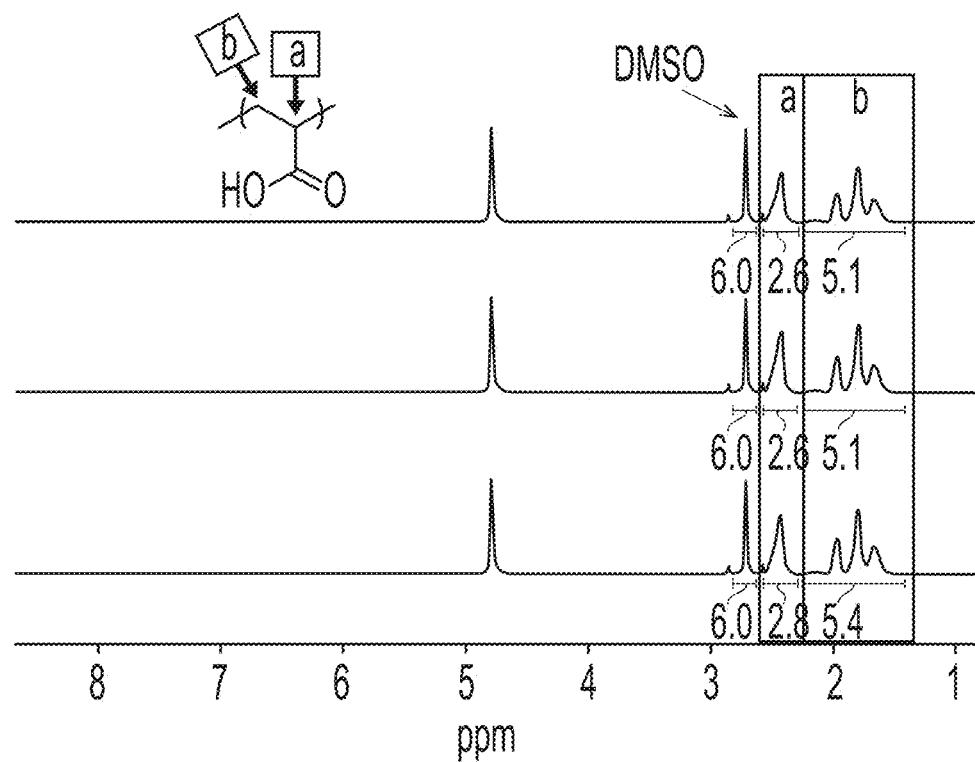
Figure 2:
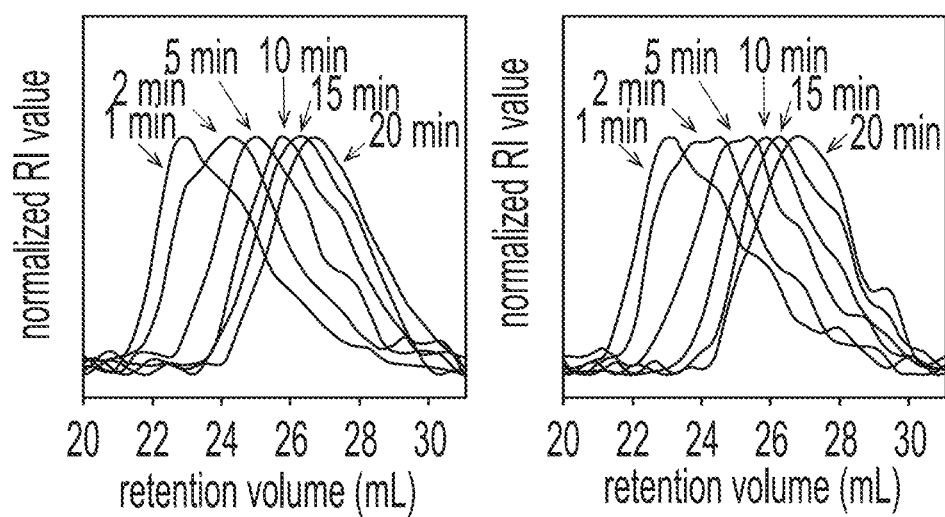
Figure 3:
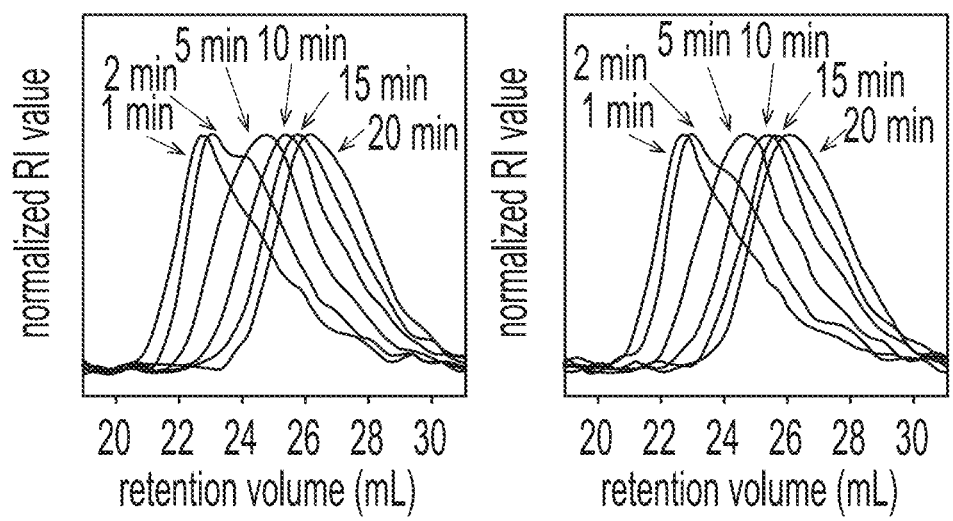
Figure 4:
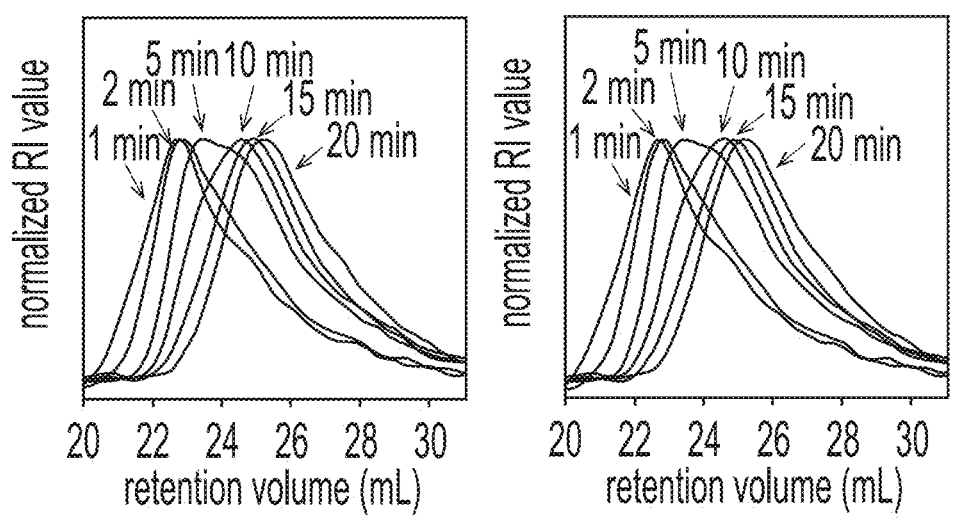
Figure 5:
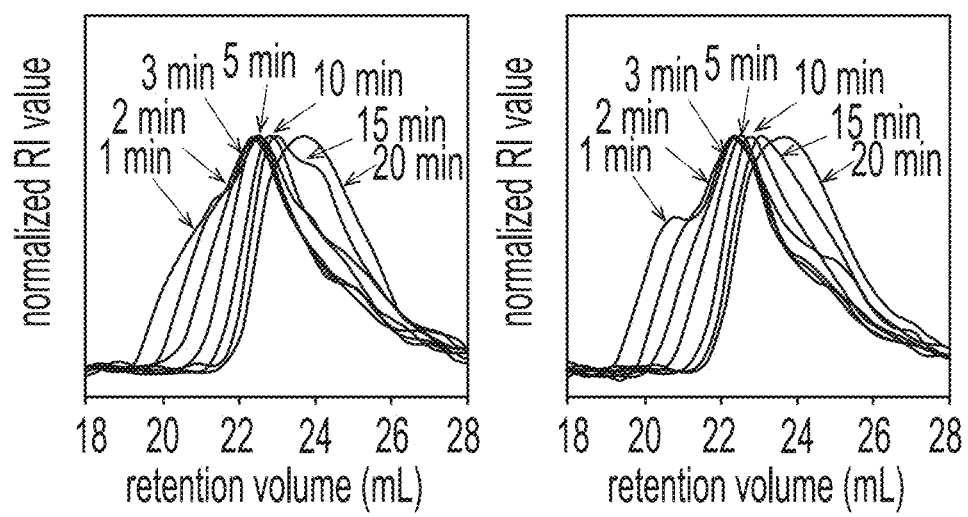
Figure 6:
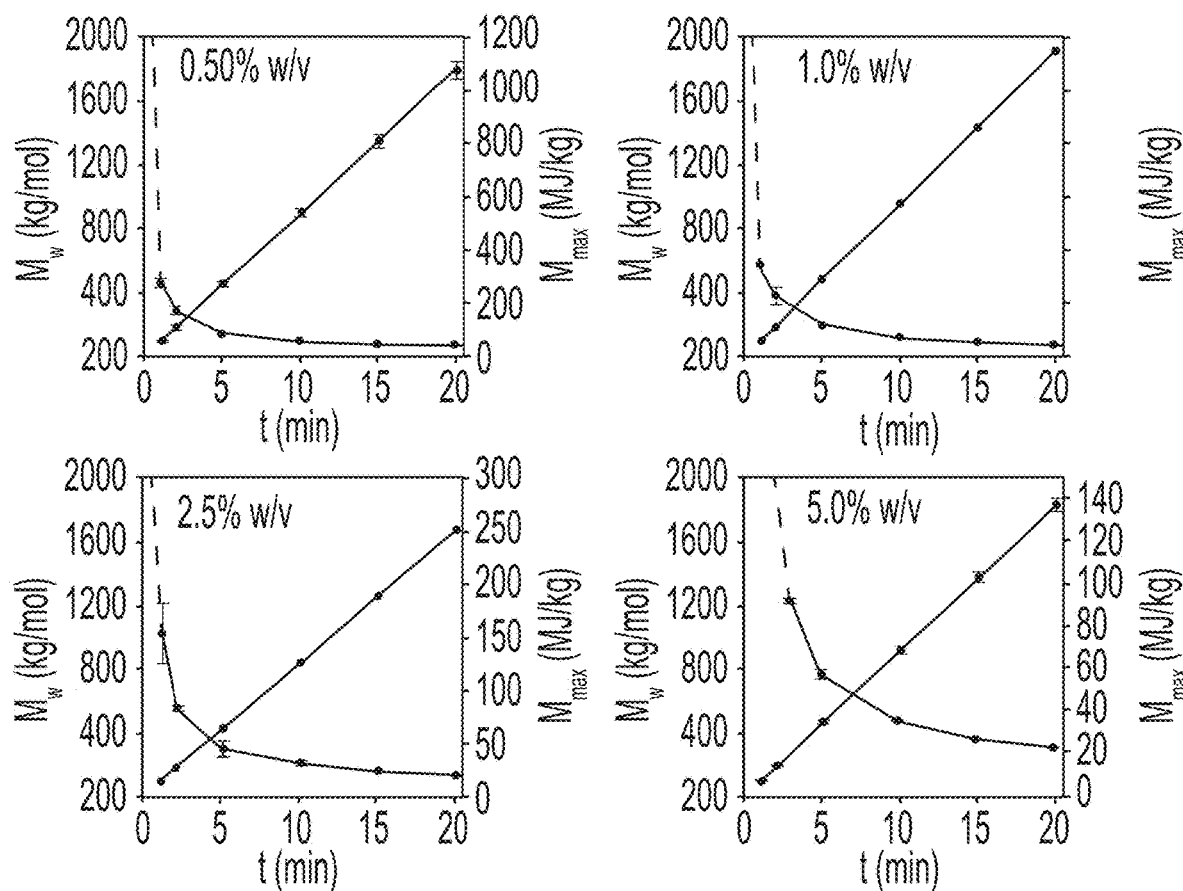
Figure 7:
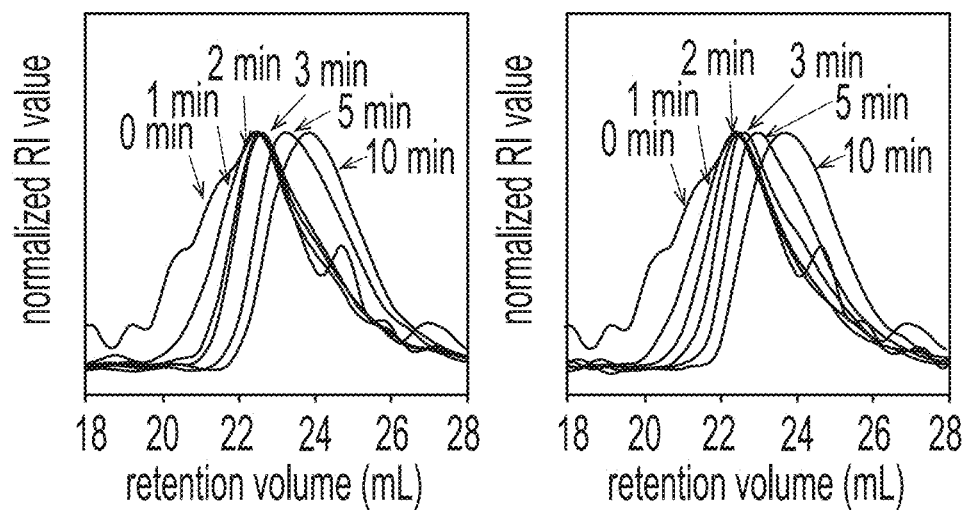
Figure 8:
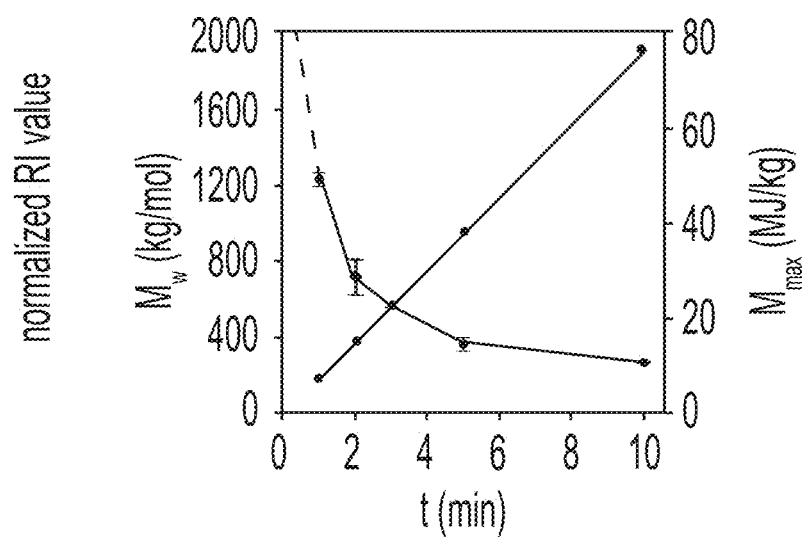
Figure 9:
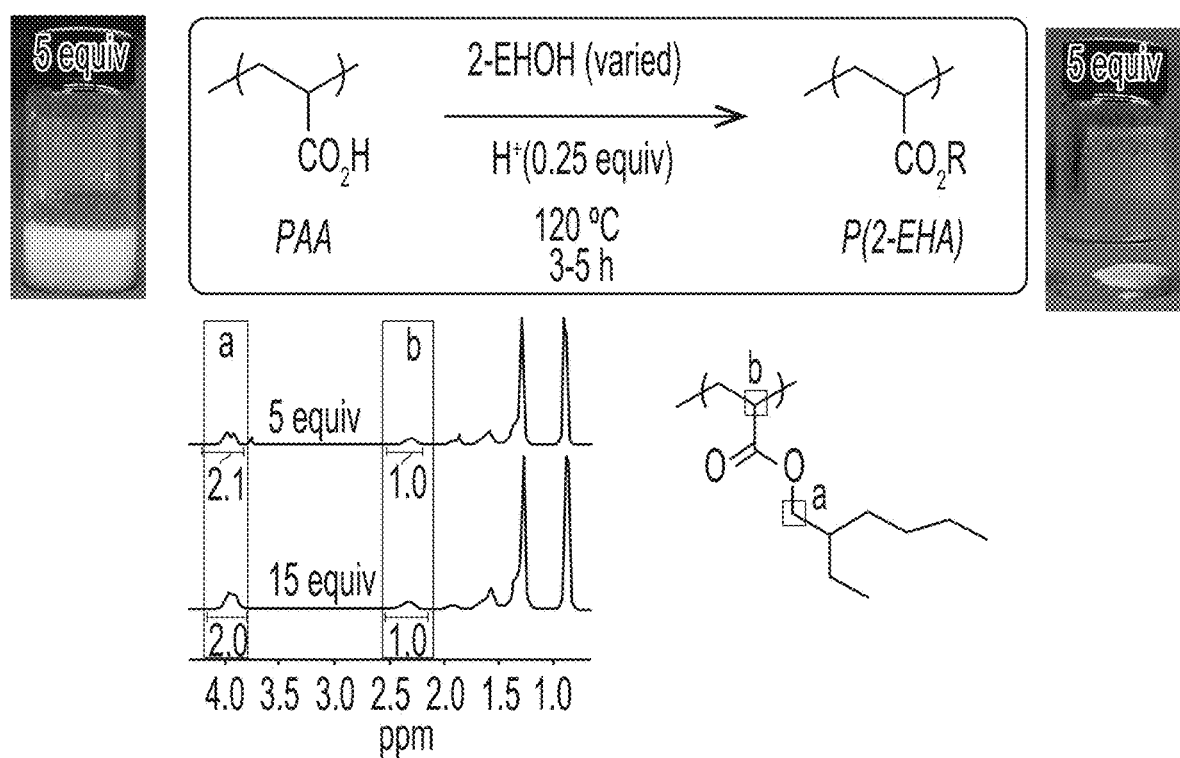
Figure 10:
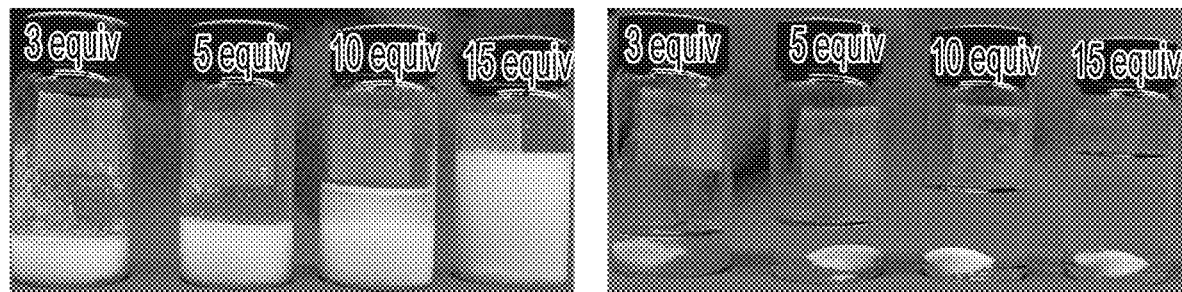
Figure 11:
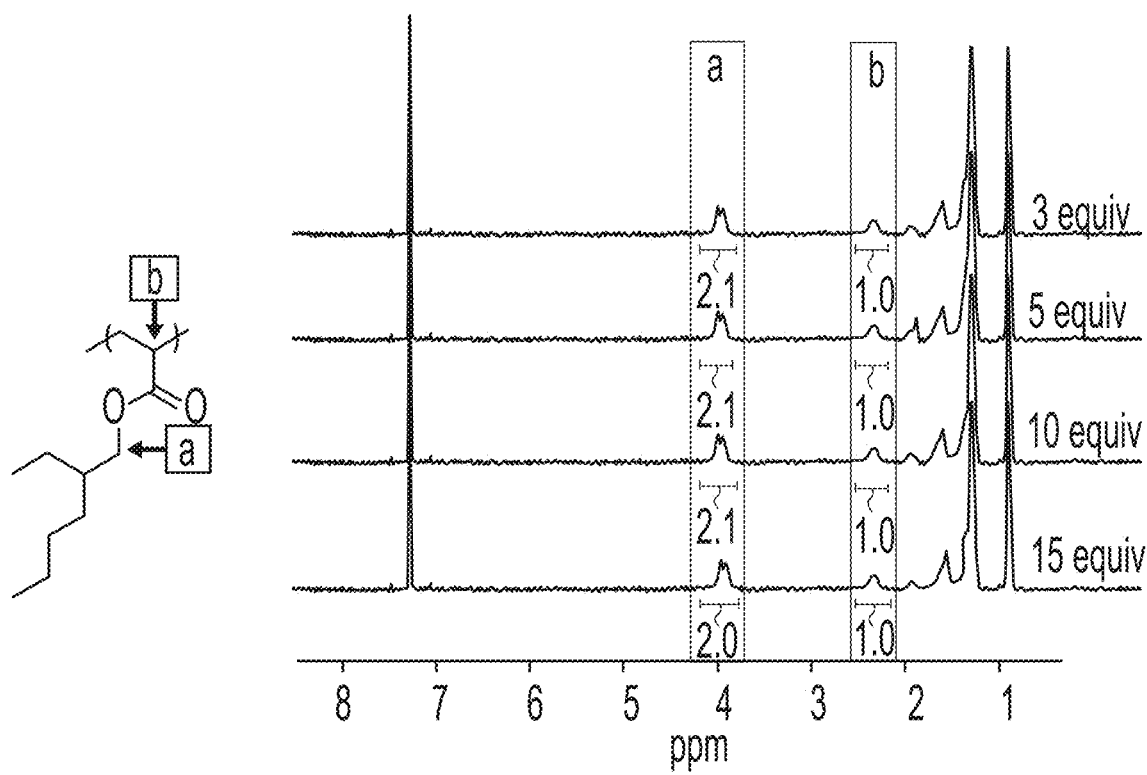
Figure 12:
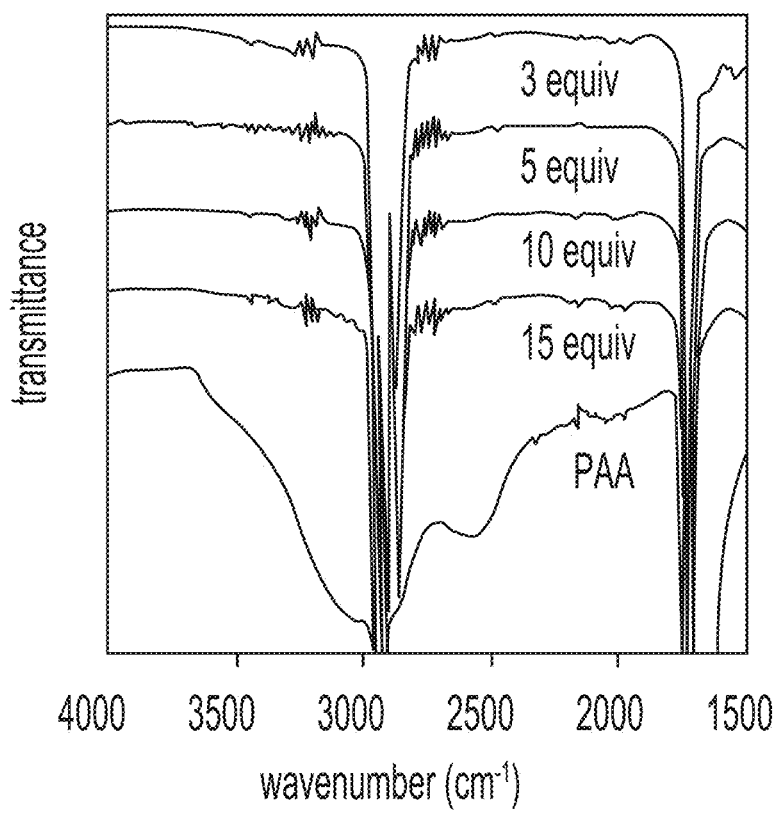
Figure 13:
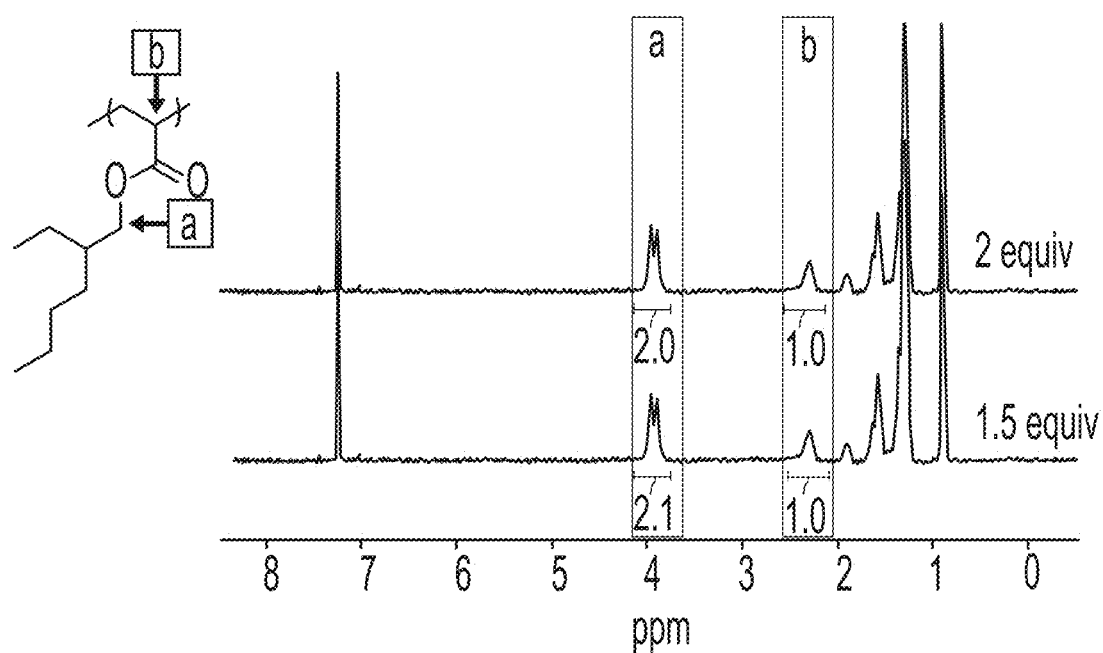
Figure 14:
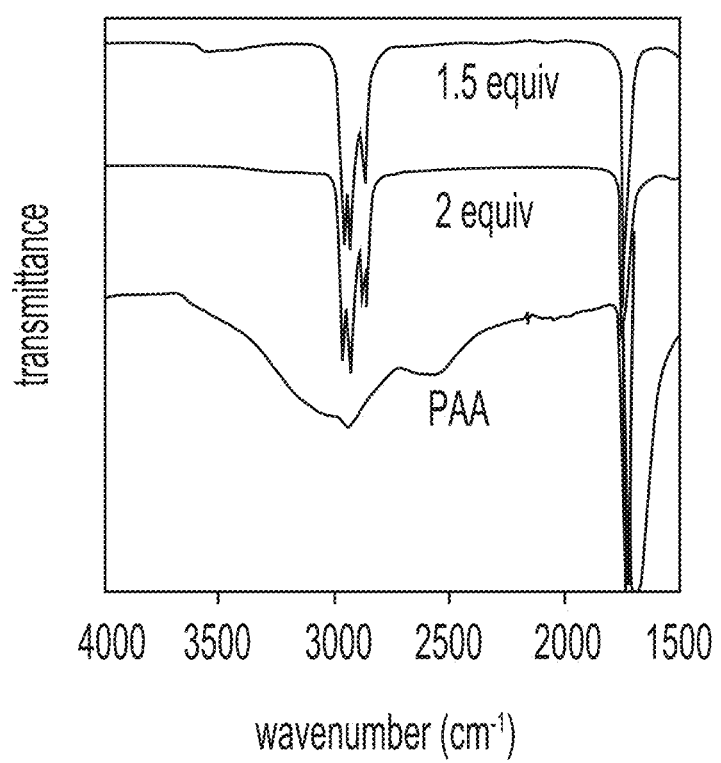
Figure 15:
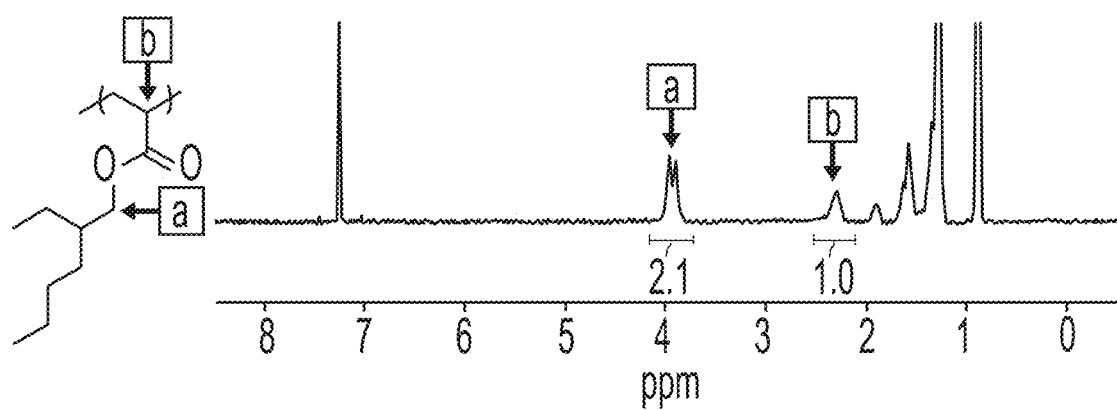
Figure 16:
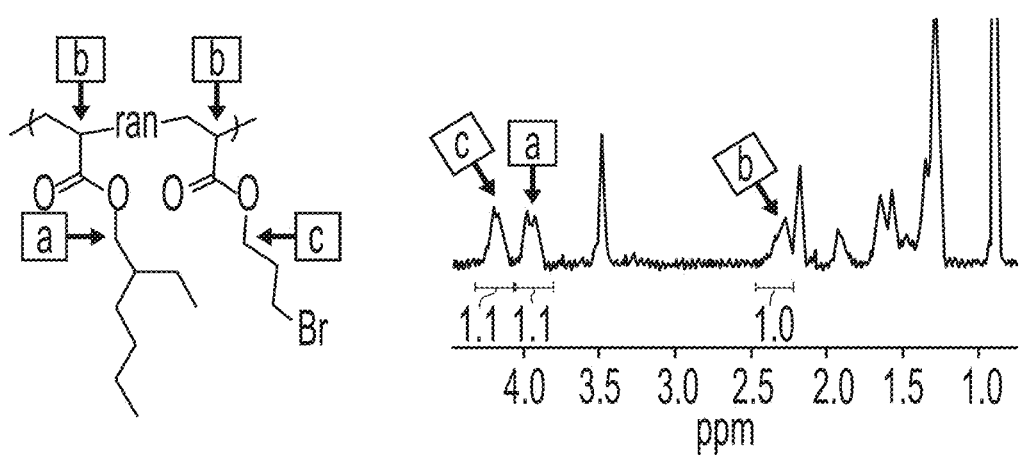
Figure 17:
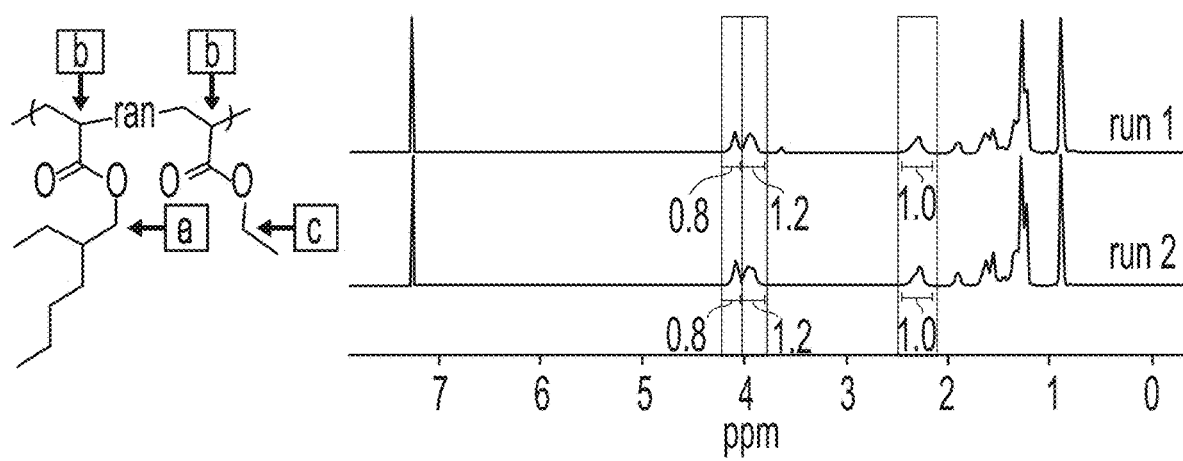
Figure 18:
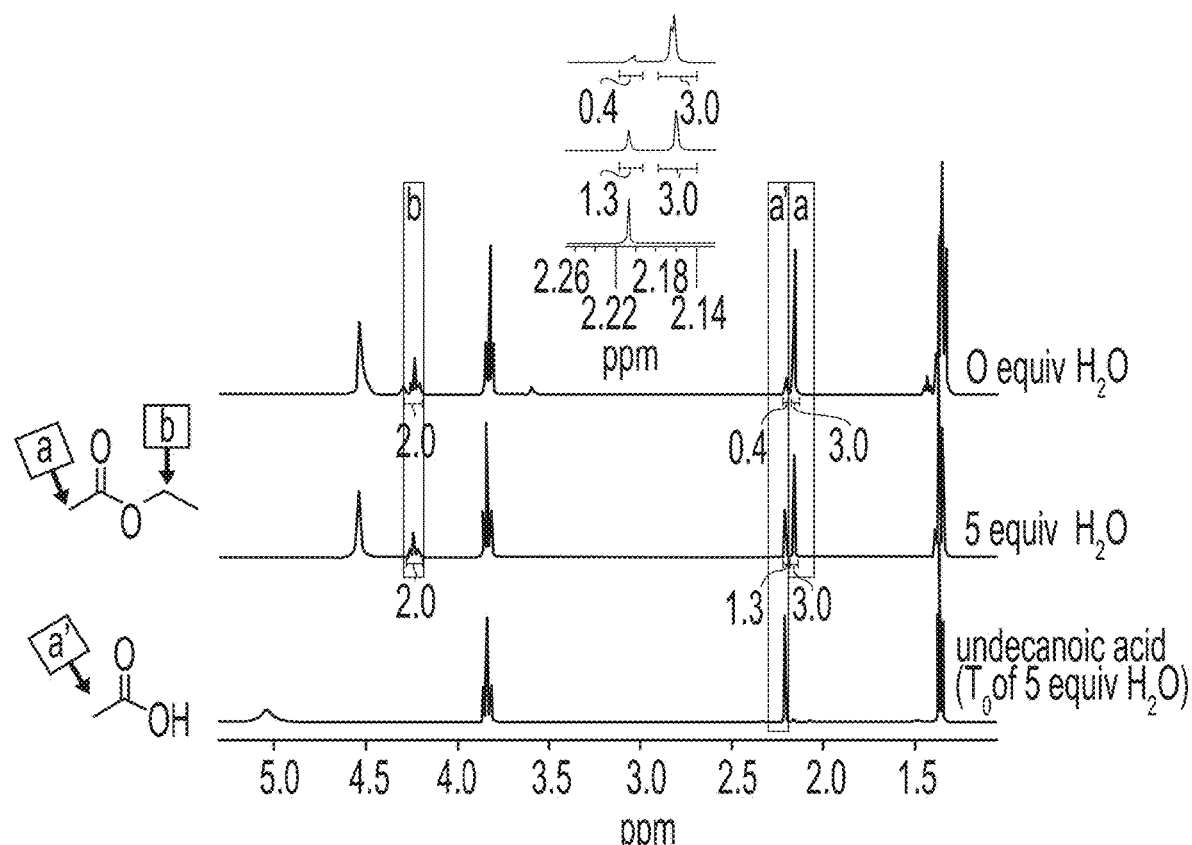
Figure 19:
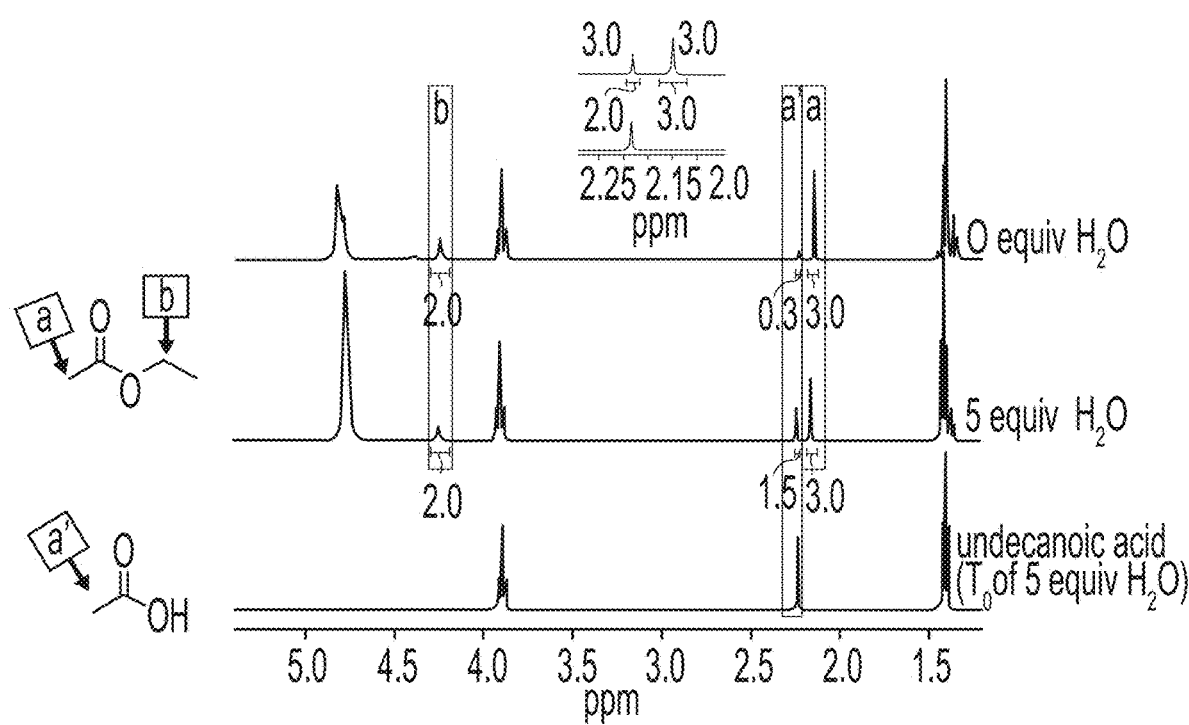
Figure 20:
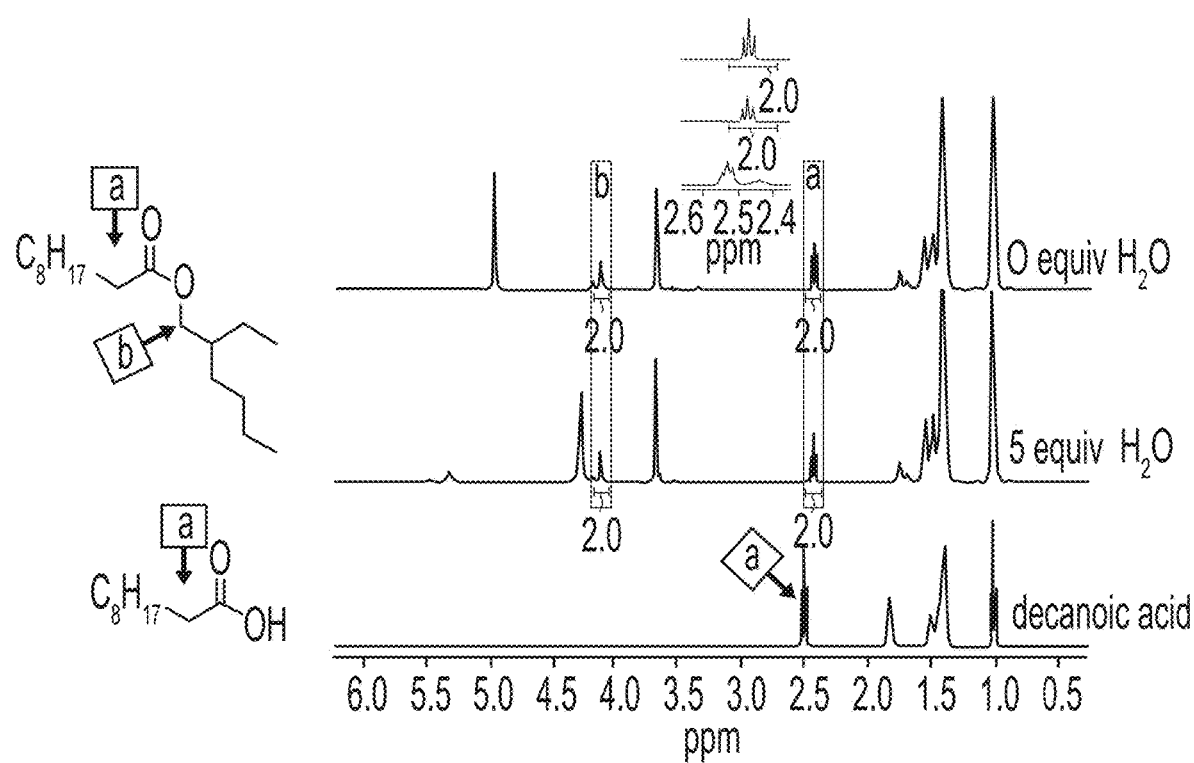
Figure 21:
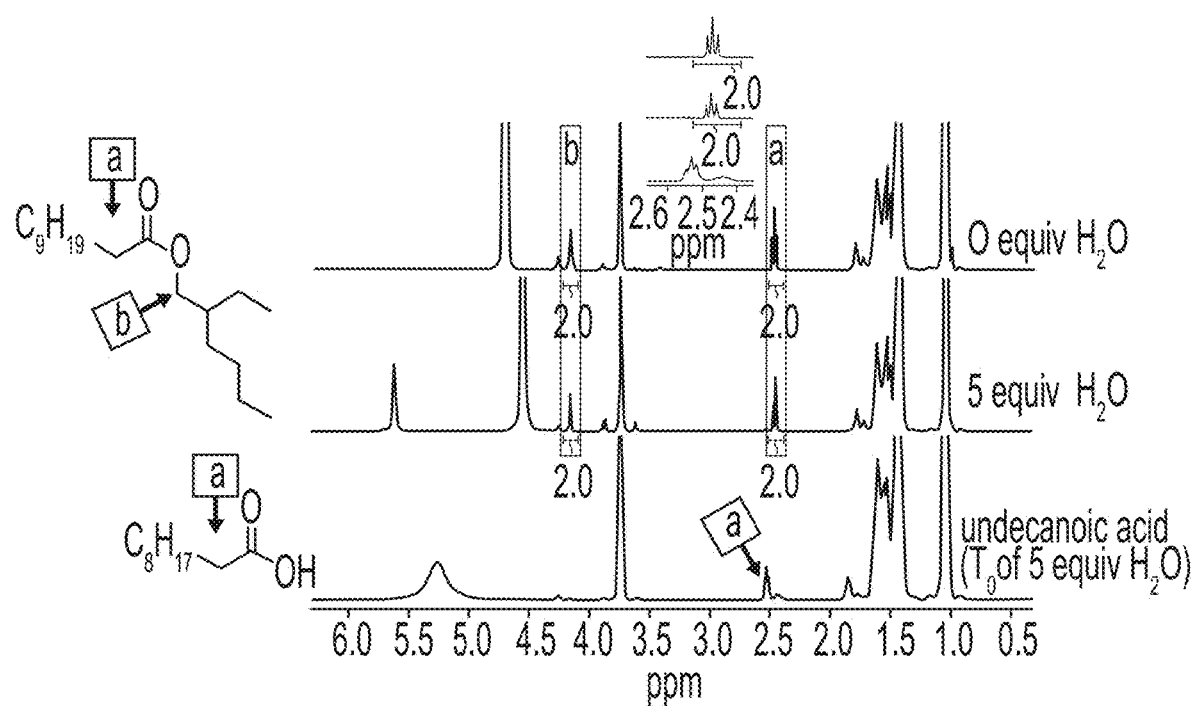
Figure 22:
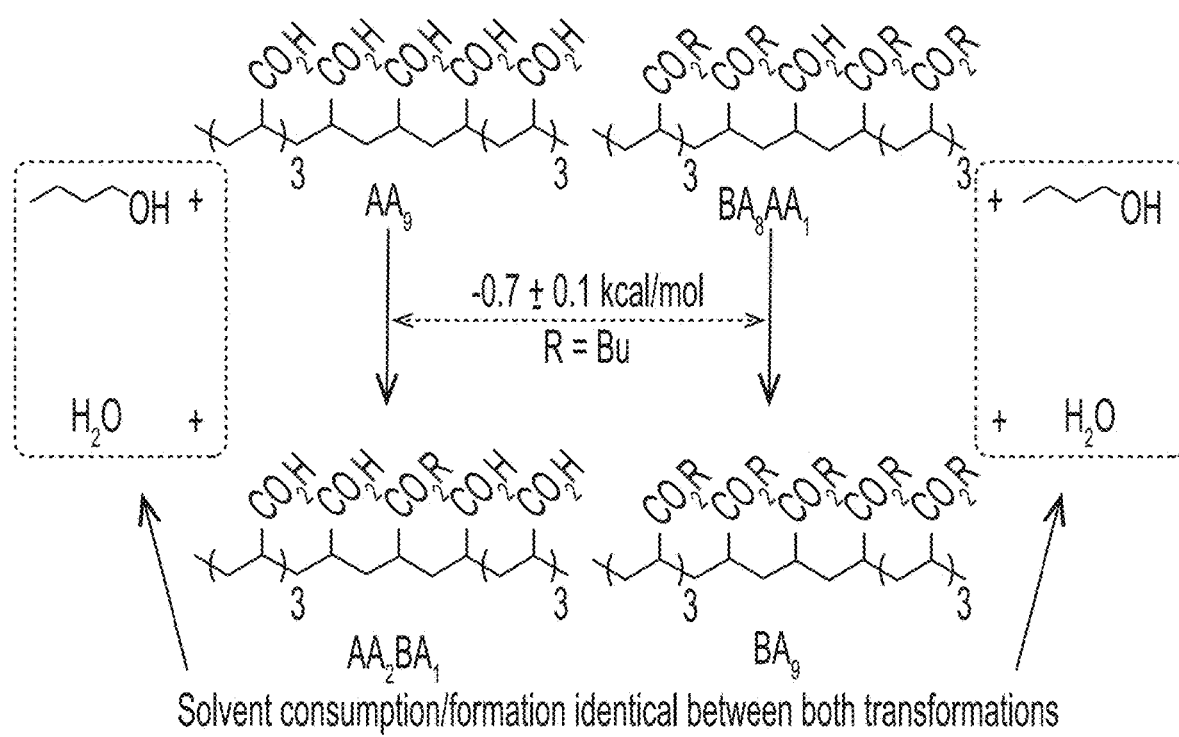
Figure 23:
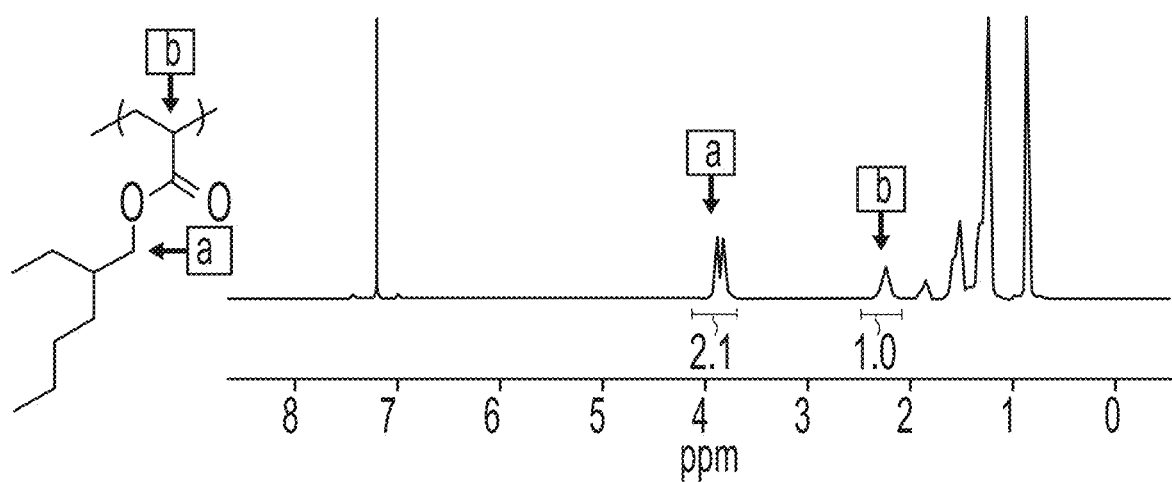
Figure 24:
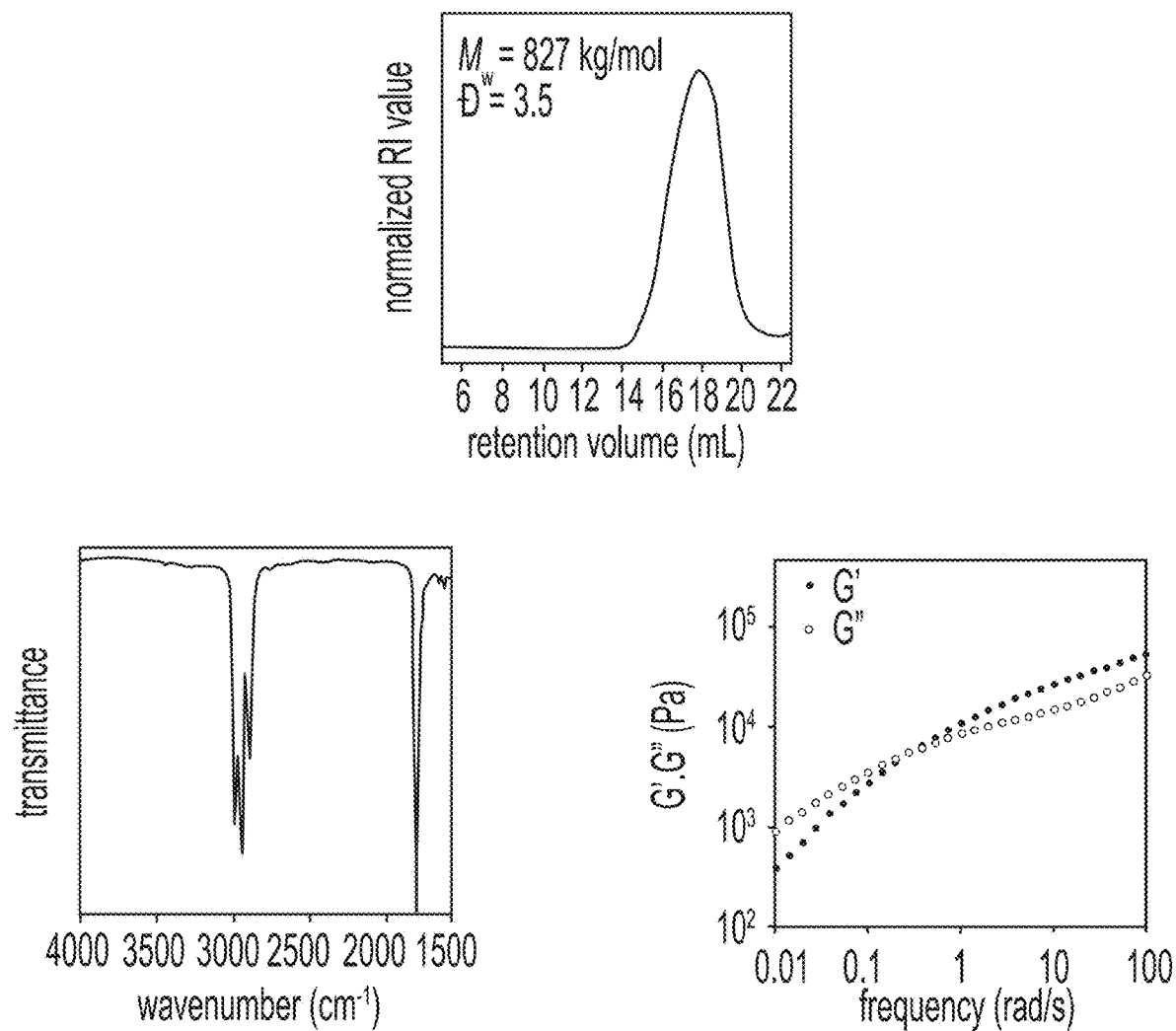
Figure 25:
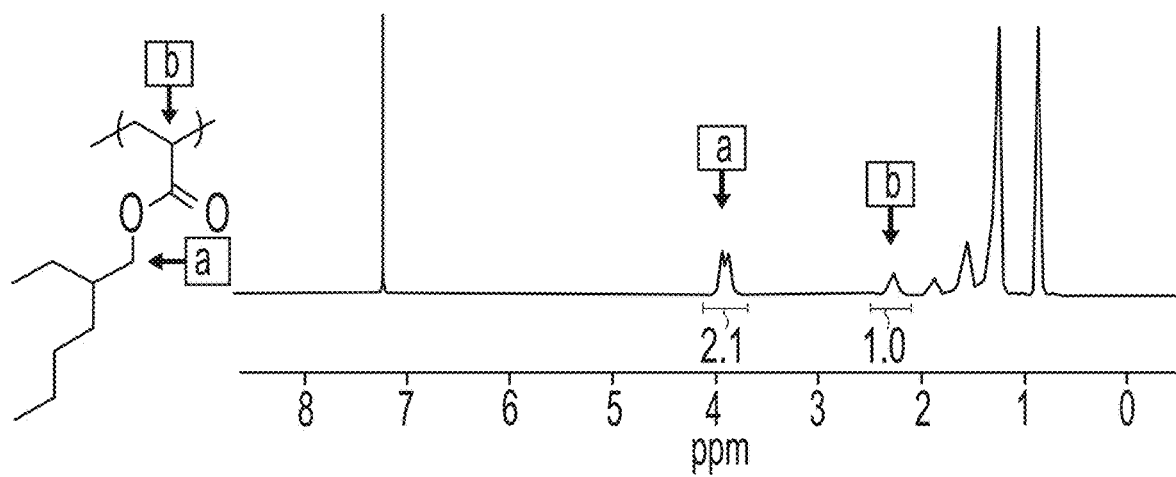
Figure 26:
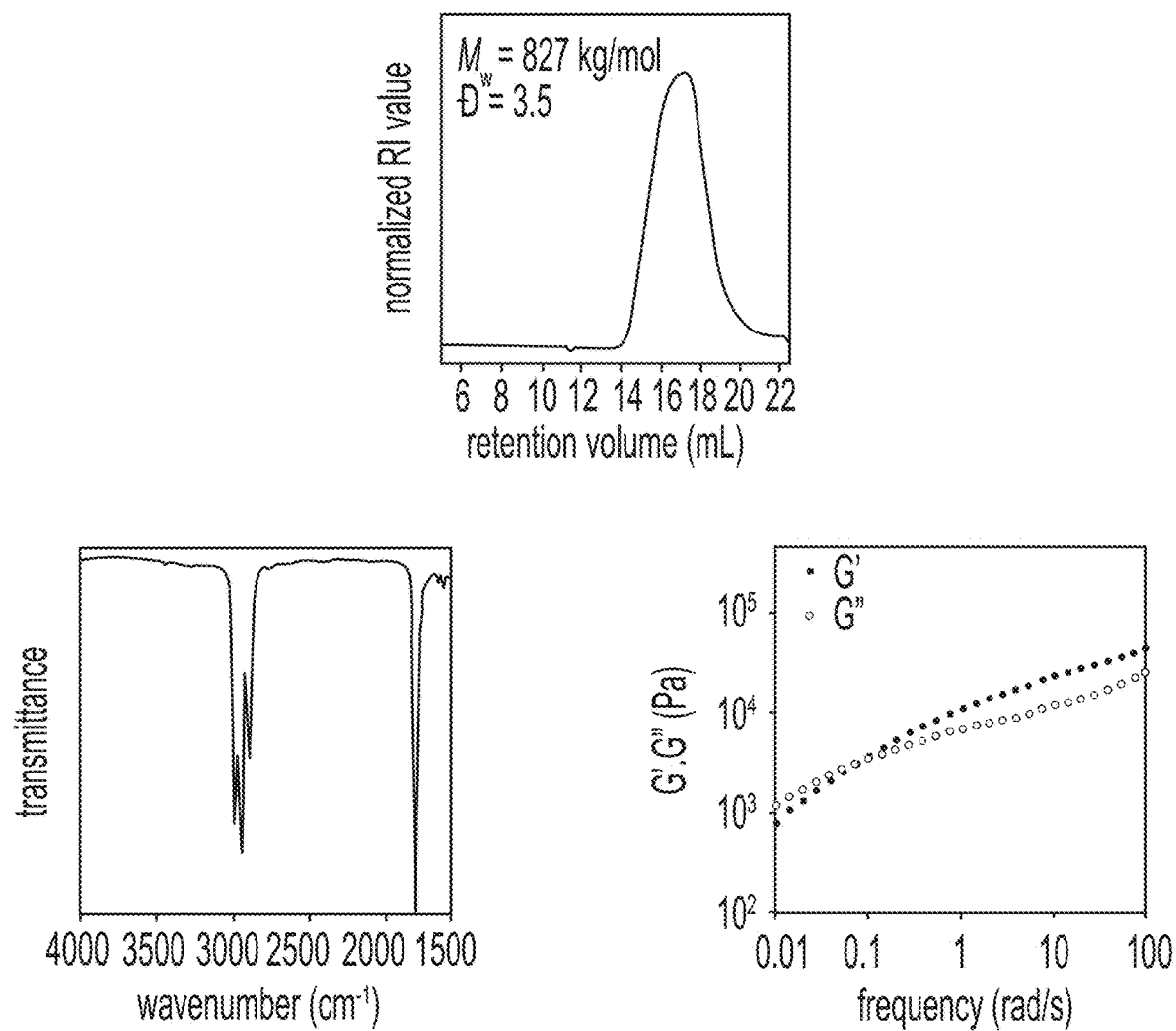
Figure 27:
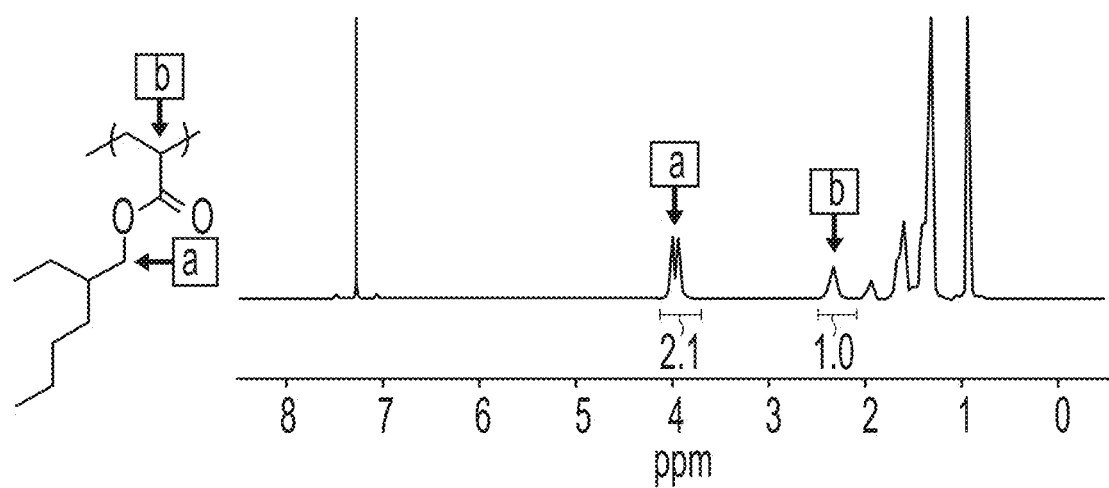
Figure 28:
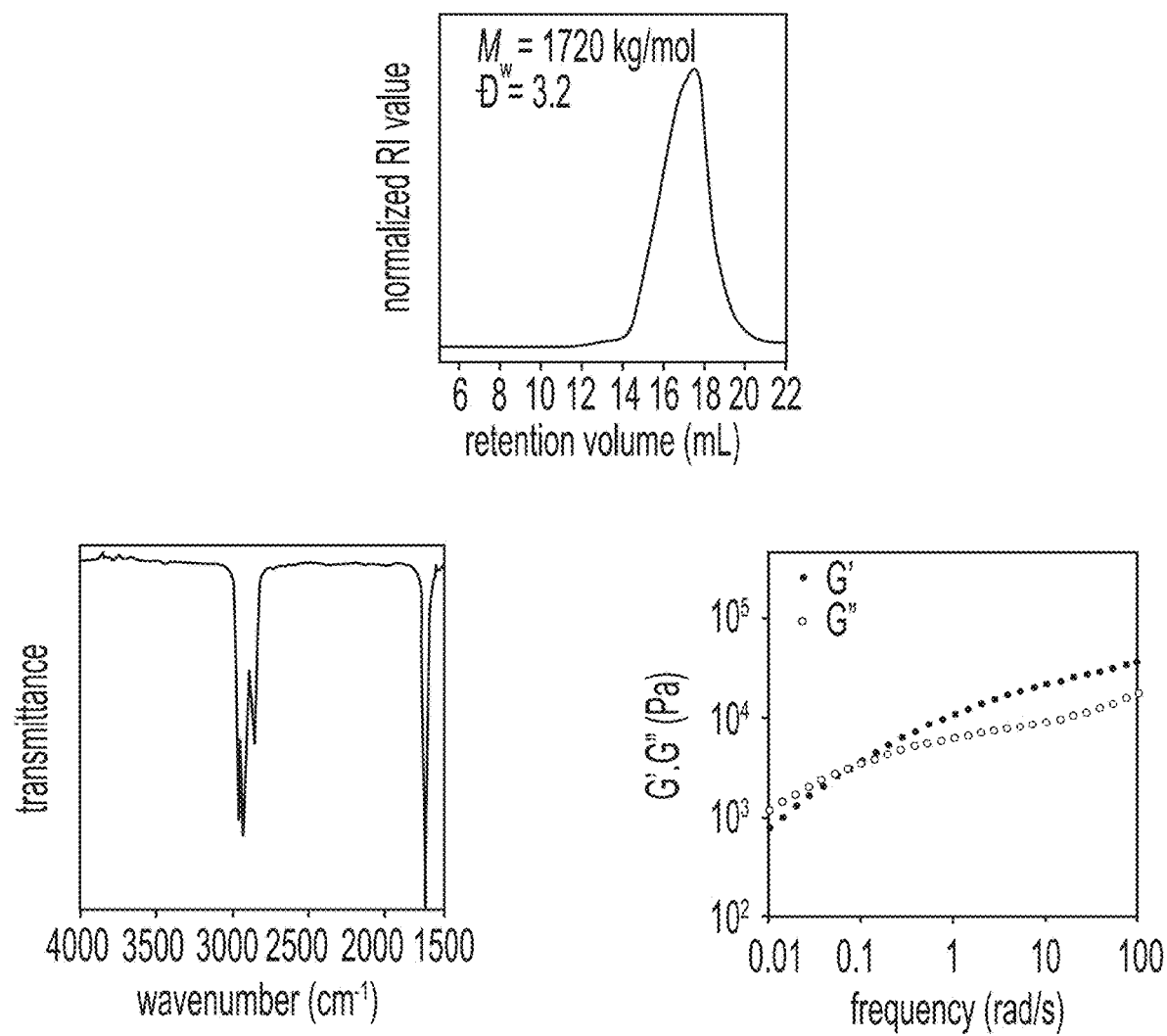
Figure 29:
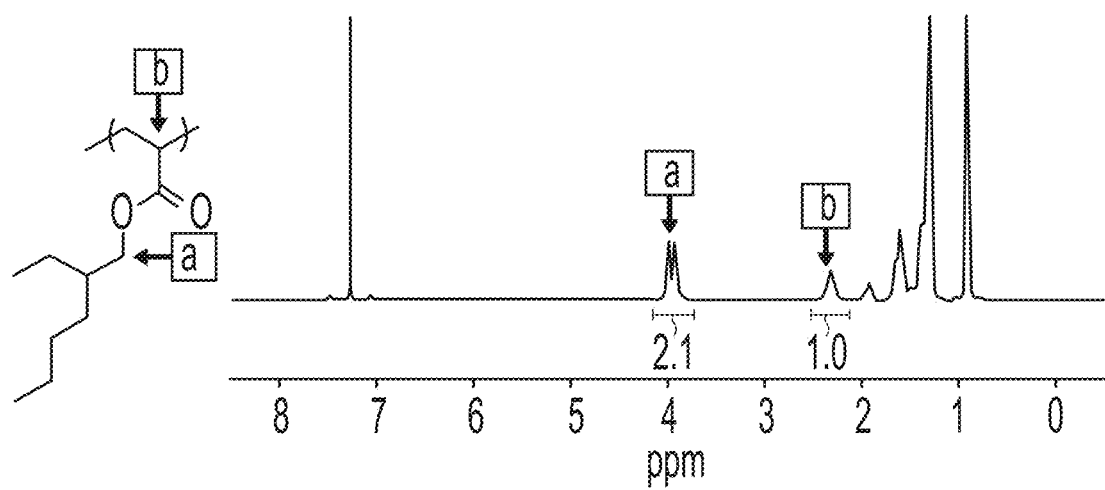
Figure 30:
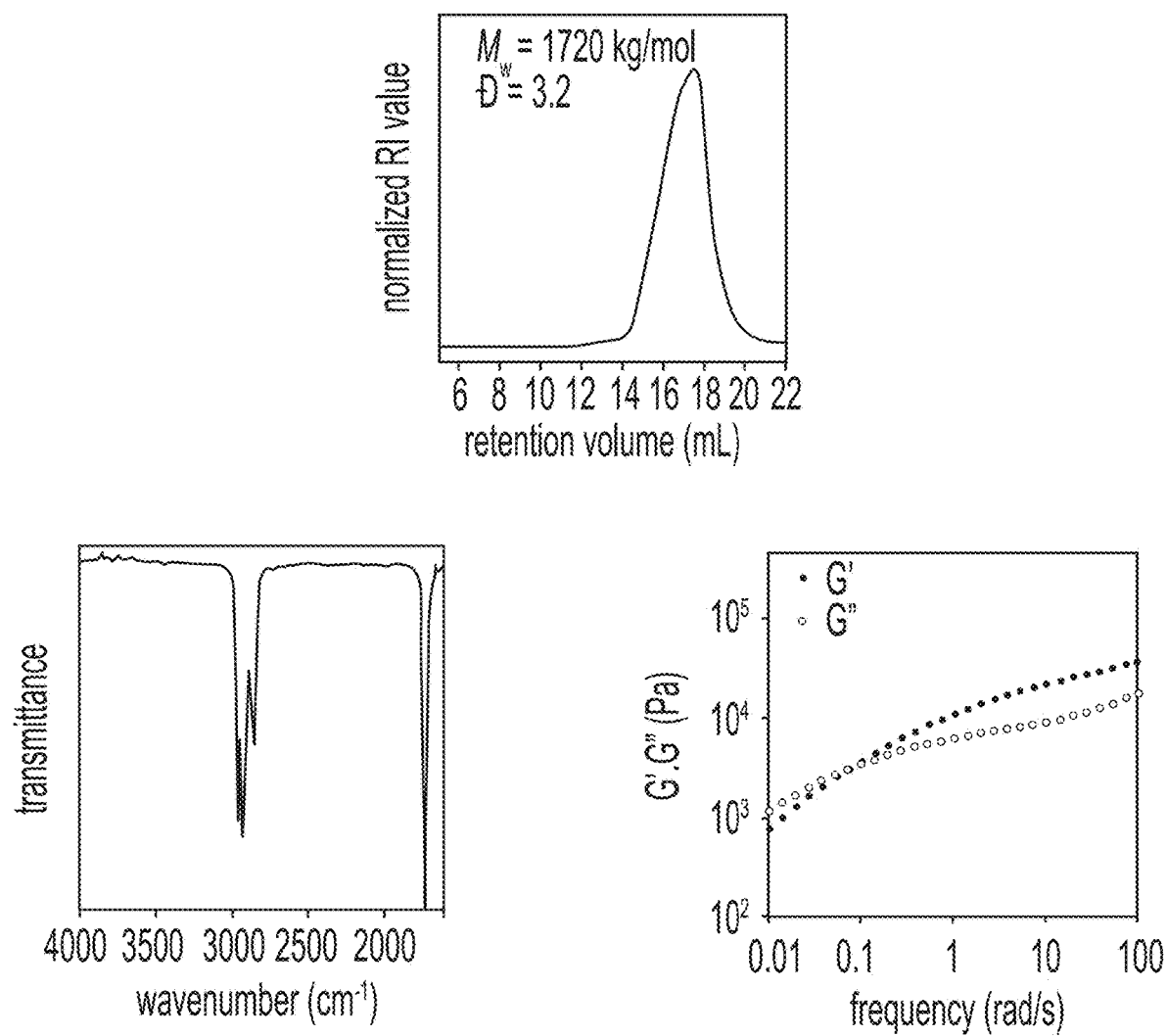
Figure 31:
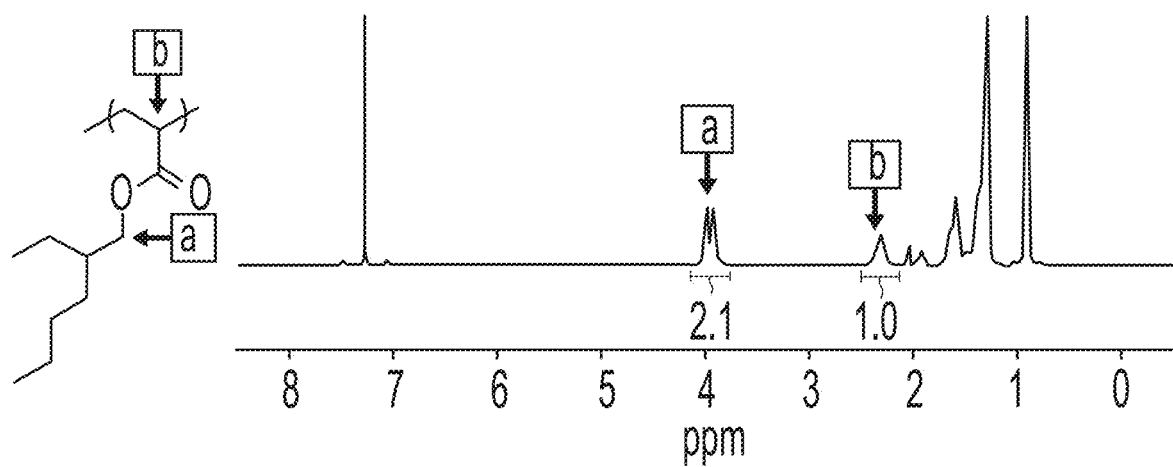
Figure 32:
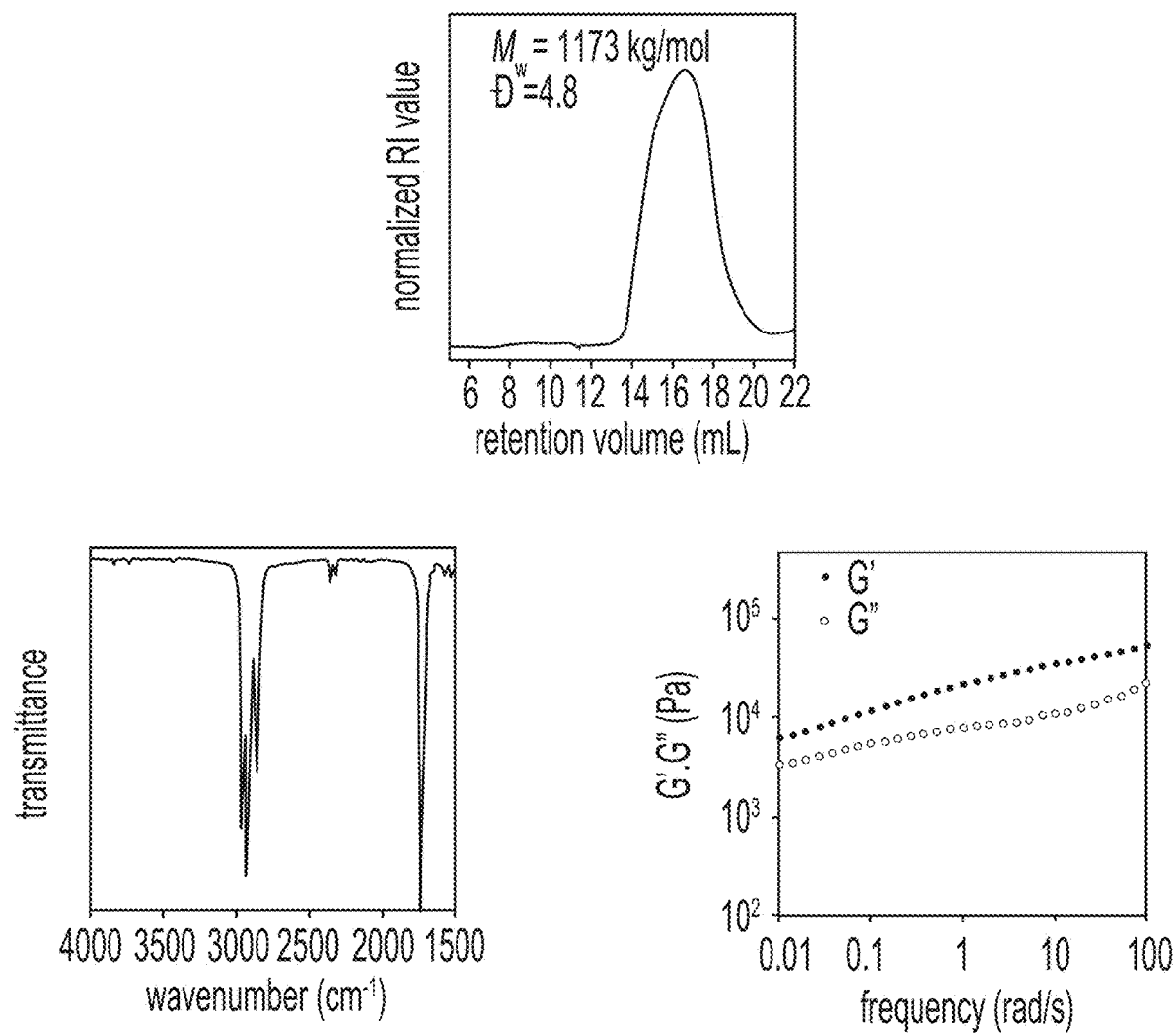
Figure 33:
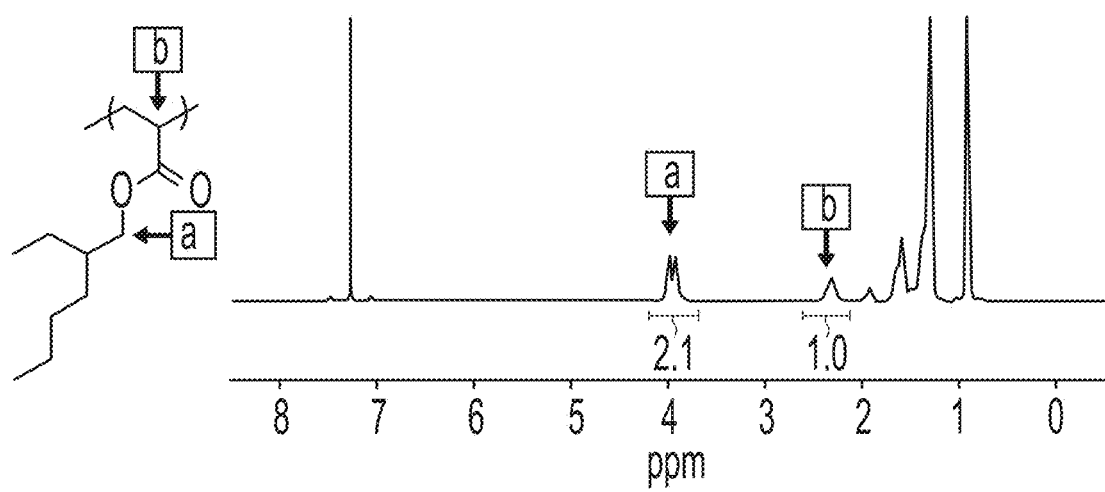
Figure 34:
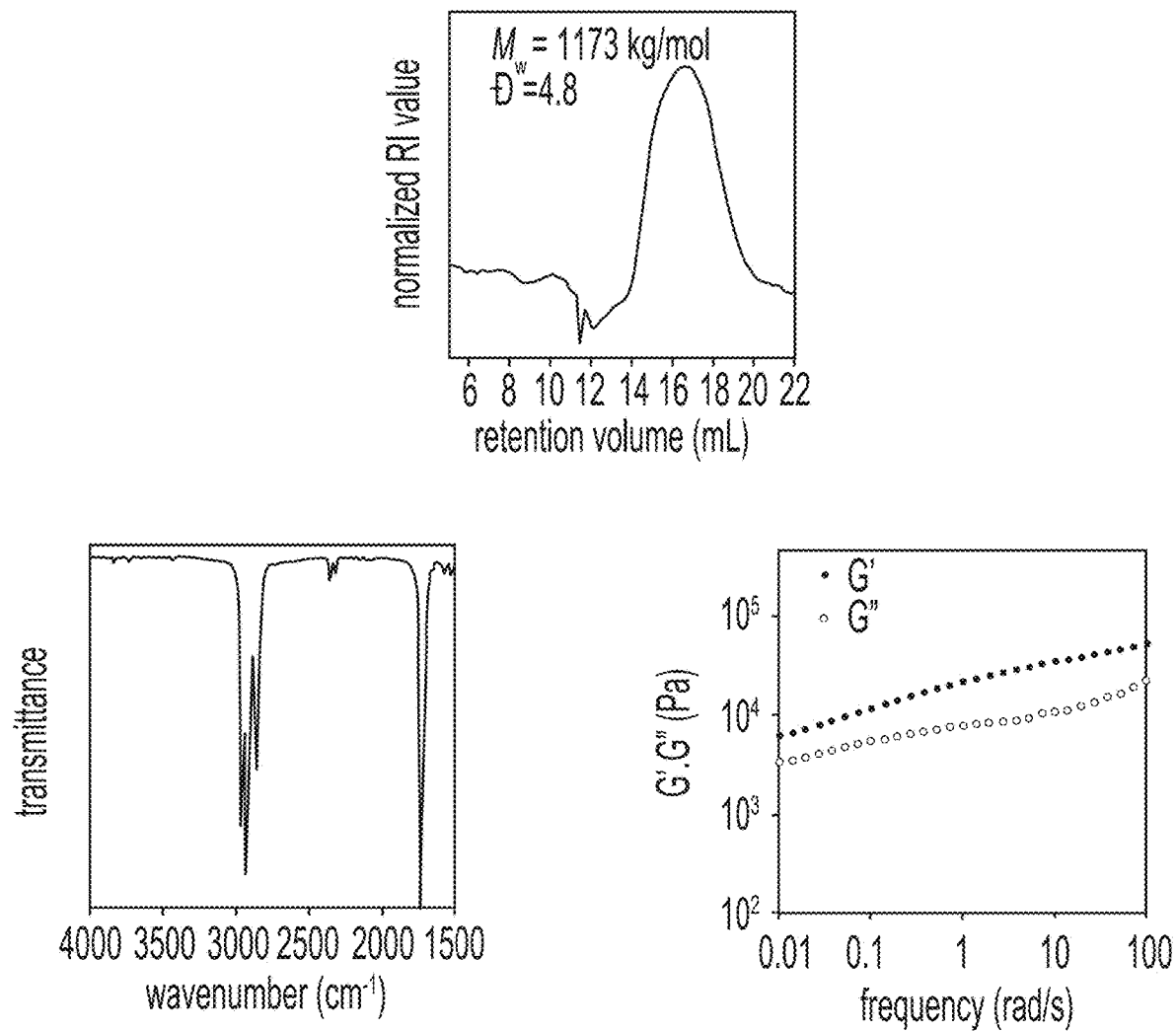
Figure 35:
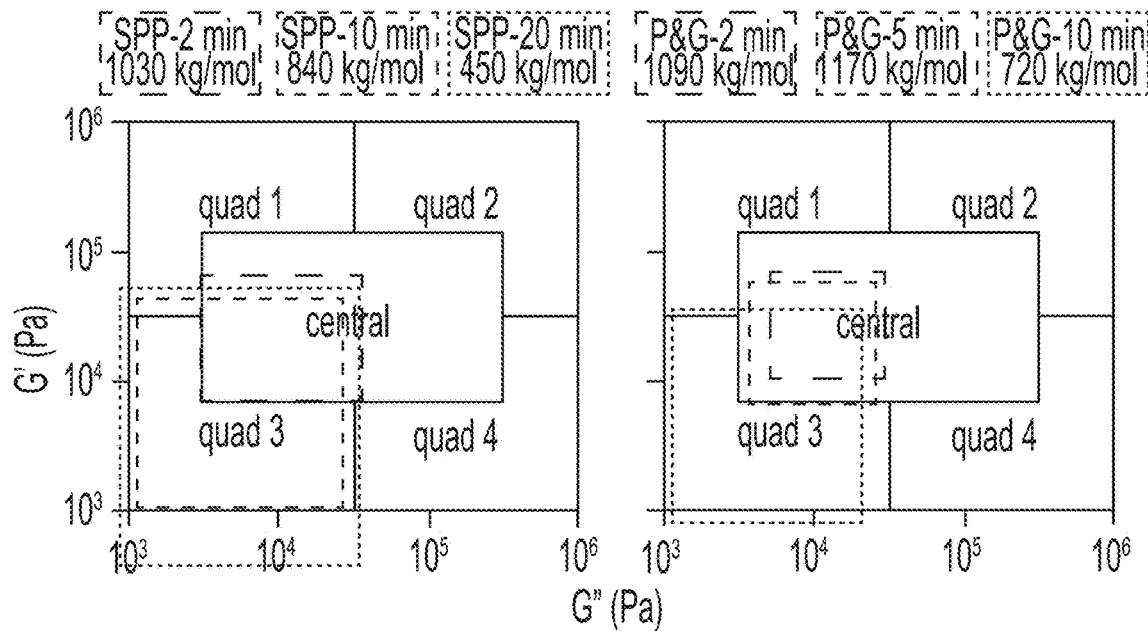

Having thus described the presently disclosed subject matter in general terms, reference will now be made to the accompanying Figures, which are not necessarily drawn to scale, and wherein:

FIG. 1 shows $^1$H NMR spectra of sonicated $PAA_{SPP}$ spiked with known amounts of DMSO (500 MHz, $CDCl_3$);

FIG. 2 shows SEC traces for sonications of $PAA_{SPP}$ at 0.50% w/v;

FIG. 3 shows SEC traces for sonications of $PAA_{SPP}$ at 1.0% w/v;

FIG. 4 shows SEC traces for sonications of $PAA_{SPP}$ at 2.5% w/v;

FIG. 5 shows SEC traces for sonications of $PAA_{SPP}$ at 5.0% w/v;

FIG. 6 shows the weight average molecular weight ($M_w$) and maximum specific energy ($w_{max}$) versus time plot for $PAA_{SPP}$ sonication at different concentrations. Dashed $M_w$ lie beyond the calibration upper limit (1100 kg/mol);

FIG. 7 shows SEC traces for sonications of decrosslinked $PAA_{P\&G}$ at 5.0% w/v;

FIG. 8 shows the weight average molecular weight ($M_w$) and maximum specific energy ($w_{max}$) versus time plot for $PAA_{P\&G}$ sonication at 5% w/v. Dashed $M_w$ lie beyond the calibration upper limit (1100 kg/mol);

FIG. 9 shows NMR spectra and photos of reaction vials for the acid-catalyzed esterification of PAA with varying quantities of 2-ethylhexanol;

FIG. 10 shows esterification reactions for 3-15 equiv. 2-ethylhexanol: before (left) and after (right) heating to 120° C. for 3-5 h;

FIG. 11 shows $^1$H NMR spectra of P(2-EHA)$_{SIGMA1}$ made from 3-15 equiv. alcohol (500 MHz, $CDCl_3$);

FIG. 12 shows IR spectra of P(2-EHA)$_{SIGMA1}$ made from 3-15 equiv. alcohol;

FIG. 13 shows $^1$H NMR spectra of P(2-EHA)$_{SIGMA1}$ made from 1.5 and 2 equiv. alcohol (500 MHz, $CDCl_3$);

FIG. 14 shows IR spectra of P(2-EHA)$_{SIGMA1}$ made from 1.5 and 2 equiv. alcohol;

FIG. 15 shows $^1$H NMR spectra of P(2-EHA)$_{SPP-20min}$ (500 MHz, $CDCl_3$);

FIG. 16 shows $^1$H NMR spectra of P(2-EHA-co-3-BPA)$_{SPP-20min}$ (500 MHz, $CDCl_3$);

FIG. 17 shows $^1$H NMR spectra of P(2-EHA-co-EA)$_{SPP-20min}$ (500 MHz, $CDCl_3$);

FIG. 18 shows NMR spectra of esterification of acetic acid with ethanol in the presence (middle) and absence (top) of water (500 MHz, $CDCl_3$/pyridine-d5 at 2:1);

FIG. 19 shows $^1$H NMR spectra of acetic acid esterification with ethanol in the presence (middle) and absence (top) of water (500 MHz, $CDCl_3$/pyridine-d5 at 2:1);

FIG. 20 shows $^1$H NMR spectra of decanoic acid esterification with 2-ethylhexanol in the presence (middle) and absence (top) of water (500 MHz, $CDCl_3$/pyridine-d5 at 2:1);

FIG. 21 shows $^1$H NMR spectra of undecanoic acid esterification with 2-ethylhexanol in the presence (middle) and absence (top) of water (500 MHz, $CDCl_3$/pyridine-d5 at 2:1);

FIG. 22 is the full thermodynamic cycle used to evaluate the free energy of esterification;

FIG. 23 is the $^1$H NMR spectrum for P(2-EHA)$_{SPP-20min}$ (500 MHz, CDCl$_3$);

FIG. 24 is the SEC trace (top), IR spectrum (left), and frequency sweep (right) for P(2-EHA)$_{SPP-20min}$;

FIG. 25 is the $^1$H NMR spectrum for P(2-EHA)$_{SPP-10min}$ (500 MHz, CDCl$_3$);

FIG. 26 is the SEC trace (top), IR spectrum (left), and frequency sweep (right) of P(2-EHA)$_{SPP-10min}$;

FIG. 27 is the $^1$H NMR spectrum for P(2-EHA)$_{SPP-2min}$ (500 MHz, CDCl$_3$);

FIG. 28 is the SEC trace (top), IR spectrum (left), and frequency sweep (right) of P(2-EHA)$_{SPP-2min}$;

FIG. 29 is the $^1$H NMR spectrum for P(2-EHA)$_{P\&G-10min}$ (500 MHz, CDCl$_3$);

FIG. 30 is the SEC trace (top), IR spectrum (left), and frequency sweep (right) of P(2-EHA)$_{P\&G-10min}$;

FIG. 31 is the $^1$H NMR spectrum for P(2-EHA)$_{P\&G-5min}$ (500 MHz, CDCl$_3$);

FIG. 32 is the SEC trace (top), IR spectrum (left), and frequency sweep (right) of P(2-EHA)$_{P\&G-5min}$;

FIG. 33 is the $^1$H NMR spectrum for P(2-EHA)$_{P\&G-2min}$ (500 MHz, CDCl$_3$); and FIG. 34 is the SEC trace (top), IR spectrum (left), and frequency sweep (right) of P(2-EHA)$_{P\&G-2min}$; and FIG. 35 shows plots of storage (G') versus loss (G") moduli for P(2-EHA)$_{SPP}$ (left) and P(2-EHA)$_{P\&G}$ (right), including visualization of Chang's viscoelastic window.

Figure 36:
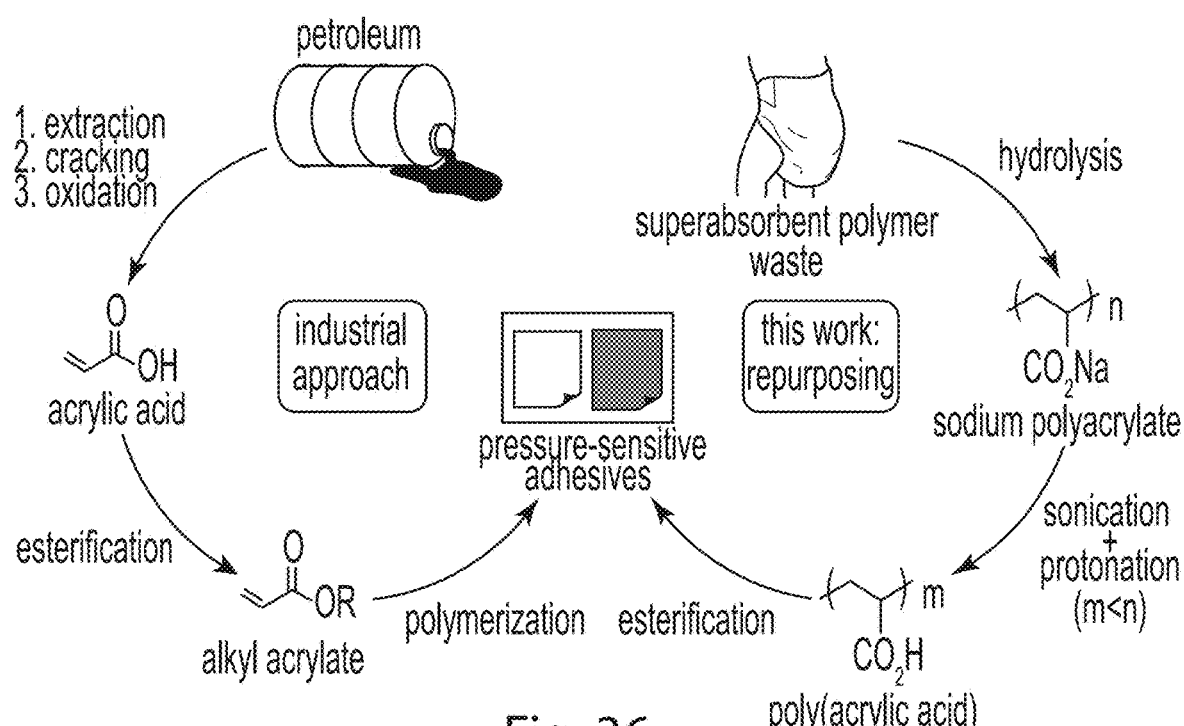

FIG. 36 is an illustration comparing syntheses of pressure-sensitive adhesives from petroleum versus waste diapers as the feedstock.

DETAILED DESCRIPTION

The presently disclosed subject matter now will be described more fully hereinafter with reference to the accompanying Figures, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Figures. Therefore, it is to be understood that the presently disclosed subject matter is not to be limited to the specific embodiments disclosed and that modifications and other embodiments are intended to be included within the scope of the appended claims.

A. Upcycling Crosslinked Sodium Polyacrylate to Pressure Sensitive Adhesives Via Mechanochemical Chain-Shortening and Esterification In some embodiments, the presently disclosed subject matter provides a practical method to upcycle sodium polyacrylate-based superabsorbent polymers (SAP) to pressure sensitive adhesives (PSAs). As used herein, the term "upcycling," also known as creative reuse, is the process of transforming by-products, waste materials, useless, or unwanted products into new materials or products of better quality and environmental value. In this instance, both SAP and PSA are used in common consumer products. For example, SAP is used prevalently in various absorbent articles including, but not limited to, diapers and feminine hygiene products. Further, PSAs are used in a variety of articles including, but not limited to, pressure sensitive tape, bandage, labels, note pads, decals, stamps, envelopes, stickers, various packaging, automobile trims, and films.

Accordingly, one goal of the presently disclosed subject matter is to recycle discarded SAP for use in a new material, e.g., PSA. The SAP described herein is an insoluble, cross-linked network polymer with an absorbency capacity of approximately 50 g/g of 0.9% NaCl (aq). Methods for the depolymerization of representative SAPs are provided in U.S. Provisional Patent Application No. 62/890,880, entitled "Depolymerization of Polymers, filed Aug. 23, 2019, which is incorporated herein by reference in its entirety. In some embodiments, the presently disclosed upcycling method includes de-crosslinking, ultrasound-induced depolymerization, and base-catalyzed co-esterification, with an optional deprotection step. The presently disclosed method achieves high molecular weight polyacrylate based PSAs having a molecular weight of about 400 to about 900 kg/mol.

More particularly, in some embodiments, the presently disclosed subject matter provides a method for preparing a pressure sensitive adhesive from one or more sodium polyacrylate-based superabsorbent polymers, the method comprising: (a) providing a solution comprising one or more sodium polyacrylate-based superabsorbent polymers; (b) decrosslinking the one or more sodium polyacrylate-based superabsorbent polymers to provide one or more decrosslinked sodium polyacrylate-based superabsorbent polymers; (c) optionally sonicating the one or more decrosslinked sodium polyacrylate-based superabsorbent polymers to provide one or more chain-shortened sodium polyacrylate-based superabsorbent polymers; (d) protonating the one or more decrosslinked and/or chain-shortened sodium polyacrylate-based superabsorbent polymers to provide one or more protonated decrosslinked and/or chain-shortened polyacrylic acid-based superabsorbent polymers; and (e) esterifying the one or more protonated decrosslinked and/or chain-shortened polyacrylic acid-based superabsorbent polymers to provide a pressure sensitive adhesive.

In particular embodiments, the one or more sodium polyacrylate-based superabsorbent polymers are derived from a disposable personal hygiene product. In more particular embodiments, the disposable personal hygiene product is selected from the group consisting of a baby diaper, an adult incontinence product, and a feminine hygiene product.

In certain embodiments of the presently disclosed method, the decrosslinking of the one or more sodium polyacrylate-based superabsorbent polymers comprises contacting the one or more sodium polyacrylate-based superabsorbent polymers with a base to provide one or more decrosslinked sodium polyacrylate-based superabsorbent polymers. In more certain embodiments, the base is an inorganic base. In even more certain embodiments, the inorganic base is selected from the group consisting of NaOH, KOH, Na$_2$CO$_3$, and K$_2$CO$_3$.

In some embodiments, the presently disclosed method further comprises removing the base from the one or more decrosslinked sodium polyacrylate-based superabsorbent polymers. In particular embodiments, the removing of the base from the one or more decrosslinked sodium polyacrylate-based superabsorbent polymers comprises dialyzing the one or more decrosslinked sodium polyacrylate-based superabsorbent polymers using a molecular porous membrane tubing. One of ordinary skill in the art would recognize that other ultrafiltration methods based on size exclusion would be suitable for use with the presently disclosed methods.

Non-limiting examples of desalination processes are membrane processes (e.g., reverse osmosis, forward osmosis, electrodialysis reversal (EDR), nanofiltration, and the like), freezing desalination, solar desalination, geothermal desalination, ion exchange, wave powered desalination, and the like.

In some embodiments of the presently disclosed method, the decrosslinking of the one or more sodium polyacrylate-based superabsorbent polymers comprises partially decrosslinking the one or more sodium polyacrylate-based superabsorbent polymers.

In some aspects, the presently disclosed method further comprises removing residual crosslinked sodium polyacrylate-based superabsorbent polymers from filtering the one or more decrosslinked sodium polyacrylate-based superabsorbent polymers by one or more methods selected from the group consisting of filtration, centrifugation, and decantation.

In particular embodiments of the presently disclosed method, the protonating of the one or more decrosslinked sodium polyacrylate-based superabsorbent polymers comprises contacting the one or more decrosslinked sodium polyacrylate-based superabsorbent polymers with a cation exchange resin to provide one or more protonated polyacrylic acid-based superabsorbent polymers. In more particular embodiments, the cation exchange resin comprises a sulfonic acid functional group. In other embodiments, the protonating of the one or more decrosslinked sodium polyacrylate-based superabsorbent polymers comprises titrating the one or more decrosslinked sodium polyacrylate-based superabsorbent polymers with HCL or $H_2SO_4$ to provide one or more protonated polyacrylic acid-based superabsorbent polymers.

In certain embodiments of the presently disclosed method, the esterifying of the one or more protonated polyacrylic acid-based superabsorbent polymers comprises contacting the one or more protonated polyacrylic acid-based superabsorbent polymers with one or more organohalide compounds. In more certain embodiments, the one or more organohalide compounds comprises a primary or a secondary organohalide compound. In yet more certain embodiments, the primary or secondary organohalide compound comprises at least one halogen atom selected from the group consisting of Cl, Br, and I. In even more certain embodiments, the primary or secondary organohalide compound comprises a $C_1$-$C_{12}$ straight-chain or branched alkyl group. In particular embodiments, the one or more organohalide compound is selected from the group consisting of methyl iodide, ethyl iodide, n-butyl bromide, n-octyl bromide, propargyl bromide (3-bromo-1-propyne), ethyl bromoacetate, ethyl chloroacetate, (1-bromoethyl)benzene, benzyl chloride, benzyl bromide, isobutenyl chloride (3-chloro-2-methylprop-1-ene), 2-ethylhexylbromide, and 2-ethylhexlchloride.

In some embodiments, the one or more organohalide compounds comprises a protecting group to provide one or more protected esterified protonated sodium polyacrylate-based superabsorbent polymers. In particular embodiments, the protecting group is selected from the group consisting of tert-butoxycarbonyl (BOC), 9-fluorenylmethoxycarbonyl (FMOC), and the like. In such embodiments, the presently disclosed method further comprises deprotecting the one or more protected esterified protonated polyacrylic acid-based superabsorbent polymers.

In some embodiments of the presently disclosed method, the esterifying of the one or more protonated polyacrylic acid-based superabsorbent polymers comprises contacting the one or more protonated polyacrylic acid-based superabsorbent polymers with one or more promoters. In certain embodiments, the one or more promoters is selected from the group consisting of 1,1,3,3-tetramethylguanidine (TMG), triethylamine, and pyridine.

In some embodiments of the presently disclosed method, the esterifying of the one or more protonated polyacrylic acid-based superabsorbent polymers is done in a polar aprotic solvent. In certain embodiments, the polar aprotic solvent is selected from the group consisting of dimethyl sulfoxide (DMSO) and N,N-dimethylformamide (DMF).

In other embodiments, the presently disclosed subject matter provides a pressure sensitive adhesive prepared by the presently disclosed methods.

In yet other embodiments, the presently disclosed subject matter provides an article comprising a pressure sensitive adhesive prepared by the presently disclosed methods. In certain embodiments, the article is selected from the group consisting of pressure sensitive tape, a bandage, a label, note pads, a decal, a stamp, an envelope, a sticker, packaging, automobile trim, and a film.

B. Esterifying Polyacrylic Acid with High Conversion

In some embodiments, the presently disclosed subject matter provides a practical method to upcycle sodium polyacrylate-based superabsorbent polymers (SAP) to pressure sensitive adhesives (PSAs). As used herein, the term "upcycling," also known as creative reuse, is the process of transforming by-products, waste materials, useless, or unwanted products into new materials or products of better quality and environmental value. In this instance, both SAP and PSA are used in common consumer products. For example, SAP is used prevalently in various absorbent articles including, but not limited to, diapers and feminine hygiene products. Further, PSAs are used in a variety of articles including, but not limited to, pressure sensitive tape, bandage, labels, note pads, decals, stamps, envelopes, stickers, various packaging, automobile trims, and films.

Accordingly, one goal of the presently disclosed subject matter is to recycle discarded SAP for use in a new material, e.g., PSA. The SAP described herein is an insoluble, crosslinked network polymer with an absorbency capacity of approximately 50 g/g of 0.9% NaCl (aq). Methods for the depolymerization of representative SAPs are provided in U.S. Provisional Patent Application No. 62/890,880, entitled "Depolymerization of Polymers, filed Aug. 23, 2019, which is incorporated herein by reference in its entirety.

More particularly, the presently disclosed subject matter, in part, provides a method for preparing a pressure sensitive adhesive (PSA) from a polyacrylic acid (PAA), such as one or more sodium polyacrylate-based superabsorbent polymers (SAP), via a process that achieve a high degree of esterification without the need to remove water from the reaction.

Fischer esterification is widely used to alkylate carboxylic acids for a variety of applications. Fischer esterification generally is the preferred method for alkylating carboxylic acids because it is cost effective and greener than the alternatives thereof. Water, which is the reaction byproduct of Fischer esterification, however, can react with the desired product to reform starting material. This byproduct reaction consequently results in low conversions. Due to this challenge, most Fischer esterification processes known in the art propose methods to remove water from the reaction mixture to push the reaction forward.

Surprisingly, the presently disclosed subject matter demonstrates that, unlike small molecule esterification processes that are impeded by water, the high degrees of esterification for polyacrylic acid can be achieved within three hours without the need to remove water. This unexpected result can be achieved at equivalences of alcohol as low as 1:2 relative to the acrylic acid repeat. As provided in more detail herein below, in some embodiments, a 1:1 ratio of alcohol to water was used (in a pressure vessel to avoid water escape) and high degrees of esterification were still achieved.

Accordingly, the presently disclosed subject matter potentially provides the cheapest and greenest way to access pressure sensitive adhesives and other useful acrylic polymers by esterifying post-consumer polyacrylic acid based materials (e.g., baby diapers).

A representative method known in the art for producing a pressure sensitive adhesive (PSA) from polyacrylic acid (PAA) is shown below:

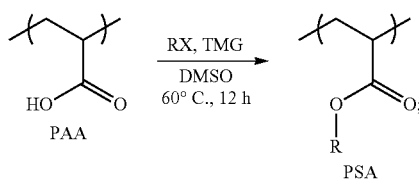

wherein: RX is an alkyl halide; TMG is 1,1,3,3-tetramethylguanidine ($Ga(CH_3)_3$), and DMSO is dimethyl sulfoxide.

In contrast, in some embodiments, the presently disclosed subject matter provides a novel method for preparing PSA from PAA as shown below:

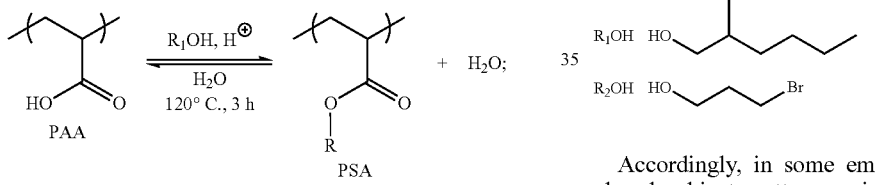

wherein ROH is an alcohol and H⊕ is a strong acid. Thus, the presently disclosed method involves the esterification of a carboxylic acid functional group with an alcohol, e.g., ROH, with heating in the presence of a strong acid.

The presently disclosed method for preparing PSA from PAA offers several advantages over those known in the art including, but not limited to, use of less toxic chemicals, cheaper reagents, and an easier and simpler purification, which uses fewer reagents and less solvents.

Further, a high degree of esterification is achieved using the presently disclosed method. For example, when $R_1$ is 2-ethylhexyl, e.g., the reaction is as follows:

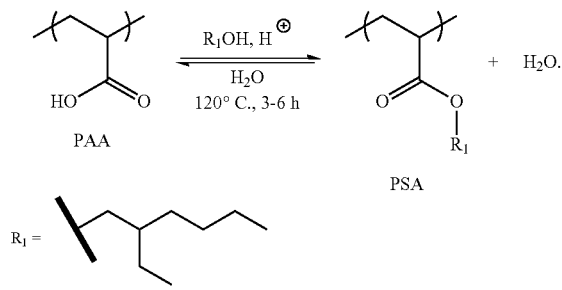

The poly(2-ethylhexyl acrylate) (PSA) formed by the method above is soluble in alcohol after 3 hrs (see FIG. 10, right side), whereas the polyacrylic acid (PAA) starting material is not soluble in alcohol (see FIG. 10, left side). In such embodiments, a high degree of esterification was confirmed by $^1$H-NMR and IR. The high conversion is achieved regardless of the amount of alcohol used.

Further, it has been unexpectedly found that the presence of water does not appreciably impede polymer esterification. In some embodiments, as provided herein below in Example 1, reactions were run in pressure vessels to prevent water escape, as follows:

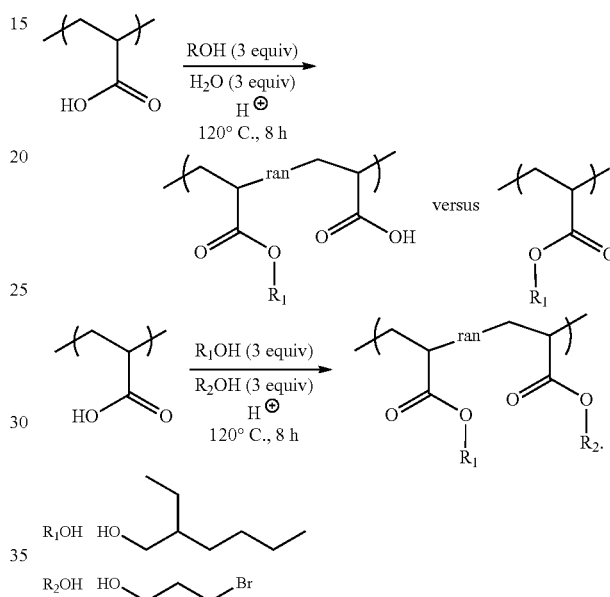

Accordingly, in some embodiments, the presently disclosed subject matter provides a method for preparing a pressure sensitive adhesive from one or more sodium polyacrylate-based superabsorbent polymers, the method comprising: (a) providing one or more sodium polyacrylate-based superabsorbent polymers; and (b) contacting the one or more sodium polyacrylate-based superabsorbent polymers with one or more alcohols in the presence of an acid for a period of time at a predetermined temperature to provide a pressure sensitive adhesive.

In certain embodiments, the one or more alcohols is selected from the group consisting of 2-ethylhexanol, 3-bromopropanol, and combinations thereof. In particular embodiments, the one or more alcohols is 2-ethylhexanol.

One of ordinary skill in the art would appreciate that the presently disclosed methods could be used with one or more alkyl alcohols. As used herein, the term "alkyl" means, unless otherwise stated, a straight (i.e., unbranched) or branched chain, acyclic or cyclic hydrocarbon group, or combination thereof, which may be fully saturated, mono-or polyunsaturated and can include di- and multivalent groups, having the number of carbon atoms designated (i.e., $C_1$-$C_{10}$ means one to ten carbons). In particular embodiments, the term "alkyl" refers to $C_1$-$C_{20}$ inclusive, linear (i.e., "straight-chain"), branched, or cyclic, saturated or at least partially and in some cases fully unsaturated (i.e., alkenyl and alkynyl) hydrocarbon radicals derived from a hydrocarbon moiety containing between one and twenty carbon atoms by removal of a single hydrogen atom.

Representative saturated hydrocarbon groups include, but are not limited to, methyl, ethyl, n-propyl, isopropyl, n-butyl, isobutyl, sec-butyl, tert-butyl, n-pentyl, sec-pentyl, iso-pentyl, neopentyl, n-hexyl, sec-hexyl, n-heptyl, n-octyl, n-decyl, n-undecyl, dodecyl, cyclohexyl, (cyclohexyl)methyl, cyclopropylmethyl, and homologs and isomers thereof.

"Branched" refers to an alkyl group in which a lower alkyl group, such as methyl, ethyl or propyl, is attached to a linear alkyl chain. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms. In certain embodiments, "alkyl" refers, in particular, to CI-8 straight-chain alkyls. In other embodiments, "alkyl" refers, in particular, to $C_{1-8}$ branched-chain alkyls.

Alkyl groups can optionally be substituted (a "substituted alkyl") with one or more alkyl group substituents, which can be the same or different. The term "alkyl group substituent" includes but is not limited to alkyl, substituted alkyl, halo, arylamino, acyl, hydroxyl, aryloxyl, alkoxyl, alkylthio, arylthio, aralkyloxyl, aralkylthio, carboxyl, alkoxycarbonyl, oxo, and cycloalkyl.

Thus, the presently disclosed methods are applicable to alkyl alcohols, including, but not limited to, methanol, ethanol, n-propanol, isopropanol, n-butanol, isobutanol, sec-butanol, tert-butanol, n-pentanol, sec-pentanol, iso-pentanol, neopentanol, n-hexanol, sec-hexanol, n-heptanol, n-octanol, n-decanol, n-undecanol, dodecanol, each of which can be substituted with one or more substituent groups, including straight-chain or branched alkyl, or halo. The terms "halo," "halide," or "halogen" as used herein refer to fluoro, chloro, bromo, and iodo groups.

In some embodiments, the acid comprises an inorganic acid. In other embodiments, the acid comprises an organic acid. Representative inorganic acids include, but are not limited to, hydrochloric acid, nitric acid, phosphoric acid, sulfuric acid, boric acid, hydrofluoric acid, hydrobromic acid, perchloric acid, and hydroiodic acid. In particular embodiments, the inorganic acid is sulfuric acid. Representative organic acids include, but are not limited to, arylsulfonic acids, such as benzenesulfonic acid, tosylic acid, p-styrenesulfone, 2-naphthalenesulfonic acid, 4-hydroxybenzenesulfonic acid, 5-sulfosalicylic acid, p-dodecylbenzenesulfonic acid, dihexylbenzenesulfonic acid, 2,5-dihexylbenzenesulfonic acid, dibutylnaphthalenesulfonic acid, 6,7-dibutyl-2-naphthalenesulfonic acid, dodecylnaphthalenesulfonic acid, 3-dodecyl-2-naphthalenesulfonic acid, hexylnaphthalenesulfonic acid, 4-hexyl-1-naphthalenesulfonic acid, octylnaphthalenesulfonic acid, 2-octyl-1-naphthalenesulfonic acid, hexylnaphthalenesulfonic acid, 7-hexyl-1-naphthalenesulfonic acid, 6-hexyl-2-naphthalenesulfonic acid, dinonylnaphthalenesulfonic acid, 2,7-dinonyl-4-naphthalenesulfonic acid, dinonylnaphthalenedisulfonic acid, 2,7-dinonyl-4,5-naphthalenedisulfonic acid, and the like.

In certain embodiments, the acid is selected from the group consisting of tosylic acid and sulfuric acid.

In certain embodiments, the one or more alcohols is present in about a 1:2 ratio relative to an acrylic acid repeat unit of the one or more sodium polyacrylate-based superabsorbent polymers. In certain embodiments, the one or more alcohols is present in about a 1:1 ratio relative to an amount of water.

In some embodiments, the predetermined temperature has range from between about 60° C. to about 180° C., including 60, 65, 70, 75, 80, 85, 90, 95, 100, 105, 110, 115, 120, 125, 130, 135, 140, 145, 150, 155, 160, 165, 170, 175, and 180° C. In particular embodiments, the predetermined temperature is about 120° C.

In some embodiments, the period of time has a range from about 1 hour to about 8 hours, including 1, 2, 3, 4, 5, 6, 7, and 8 hours. In particular embodiments, the period of time is about three hours.

In more particular embodiments, the method does not require a step of removing water. In even yet more particular embodiments, the method is performed in a pressure vessel.

In particular embodiments, the one or more sodium polyacrylate-based superabsorbent polymers are derived from a disposable personal hygiene product. In more particular embodiments, the disposable personal hygiene product is selected from the group consisting of a baby diaper, an adult incontinence product, and a feminine hygiene product.

In other embodiments, the presently disclosed subject matter provides a pressure sensitive adhesive prepared by the presently disclosed methods.

In yet other embodiments, the presently disclosed subject matter provides an article comprising a pressure sensitive adhesive prepared by the presently disclosed methods. In certain embodiments, the article is selected from the group consisting of pressure sensitive tape, a bandage, a label, note pads, a decal, a stamp, an envelope, a sticker, packaging, automobile trim, and a film.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter. The synthetic descriptions and specific examples that follow are only intended for the purposes of illustration, and are not to be construed as limiting in any manner to make compounds of the disclosure by other methods.

Example 1

Repurposing Superabsorbent Polymer Waste into Pressure-Sensitive Adhesives 1.1. Overview Recycling or repurposing commercial polymers can attenuate their environmental impact by minimizing the further depletion of nonrenewable resources, recouping the energy used to make them, and preventing them from becoming pollutants. The presently disclosed subject matter provides an approach to repurpose superabsorbent polyacrylates to make pressure-sensitive adhesives. The 3-step repurposing method utilizes decrosslinking via alkaline hydrolysis, chain-shortening via sonication, and functionalizing via Fischer esterification. The resulting adhesives exhibit low-to-medium storage and loss moduli at room temperature, and as such, are applicable to general-purpose removable adhesive products, including tapes, bandages, and sticky notes.

1.2. Background

Commercial polymers are ubiquitous but unsustainable because the vast majority of their feedstocks originate from nonrenewable resources, Geyer et al., 2017, and approx. 75% are disposed of after a single use. Advancing Sustainable Materials Management, 2017. Although durability and strength are advantages of synthetic polymers, these properties are also responsible for their environmental persistence. Plastics and the Environment, 2003; Rochman, 2018; Barnes et al., 2009. One solution is to develop biodegradable polymers that readily breakdown in the environment. Schneiderman et al., 2017; Haider et al., 2019; Zhang et al., 2018. These materials, however, often have poorer mechanical properties (e.g., processability), Vieira et al., 2011, and this approach does not allow for recovering the energy used to synthesize the polymer.

An appealing alternative is to use post-consumer polymers as a feedstock for new materials. This approach, known as chemical recycling, can either involve depolymerization/repolymerization or repurposing via functionalization. Hong et al., 2017; Rahimi and Garcia, 2017; Thiounn and Smith, 2020; Coates and Getzler, 2020. For many polymers, depolymerization/repolymerization is not feasible because chemical degradation outcompetes controlled depolymerization. As an example, gradually heating poly(acrylic acid) (PAA) in bulk, McNeill and Sadeghi, 1990, and solution, Lépine and Gilbert, 2002, primarily leads to dehydration and decarboxylation. Chemical recycling via repurposing uses synthetic methods to generate new materials from polymer waste. Recent examples include C-H functionalization of polyolefins, Williamson et al., 2019, Lewis et al., 2020, and alkane metathesis on polyolefins to generate hydrocarbon fuels. Celik et al., 2019, Jia et al, 2016.

Provided herein is a mild and energy-efficient route for repurposing the acrylic-based superabsorbent material used in disposable diapers and feminine hygiene products. The global annual production of this superabsorbent material is estimated to be over 2 million metric tons, with disposable diapers claiming 74% of the market. Future Market Insights. Unfortunately, the used diapers sit in landfills for centuries without substantial biodegradation. Plastics and the Environment, 2003. Most commercial poly(acrylates) are accessed via air-sensitive polymerizations that rely on petroleum-sourced monomers (Scheme 1 left in FIG. 36). U.S. Pat. No. 9,822,286; Pocious, 2012; Lehmann, 2015.

Instead, the presently disclosed subject matter provides a method for repurposing waste superabsorbent polymer into PSAs via three simple steps: (i) decrosslinking to generate linear polymers, (ii) sonicating to lower the average molecular weight, and (iii) functionalizing via esterification to generate tack (Scheme 1 right in FIG. 36).

1.3 Results and Discussion 1.3.1 Decrosslinking Via Hydrolysis

The superabsorbent polymer sample provided by Procter & Gamble is sodium poly(acrylate) crosslinked with poly(ethylene glycol) diacrylate ($PAA_{P\&G}$). Initial attempts at preparing aqueous solutions with >1% w/v were unsuccessful because the $PAA_{P\&G}$ absorbed all of the water. Liang et al., 2018. To circumvent this problem, the acrylate crosslinks were hydrolyzed with NaOH and mild heating to generate highly soluble linear polymers (eq 1 and section 1.9, herein below). Note that higher NaOH concentrations resulted in faster decrosslinking (e.g., 24 h at 0.3 M versus 3 h at 3 M). The decrosslinked $PAA_{P\&G}$ was soluble at 5% w/v in water, which was the concentration used in the remaining studies.

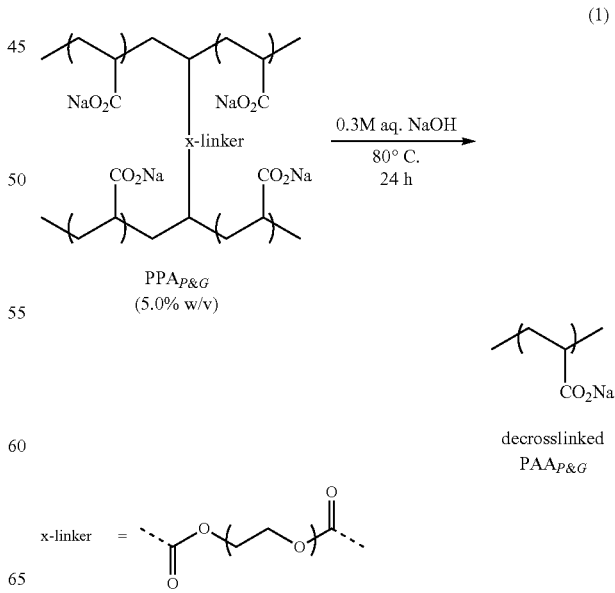

1.3.2 Chain-Shortening Via Sonication.

Sonication has previously been used to chain-shorten high-molecular weight polymers with various backbone architectures, Caruso et al., 2009; Li et al., 2015, including PAA. Prajaat and Gogate, 2016. Under ultrasound, solvodynamic shear forces cleave polymer chains into shorter fragments while maintaining the polymer's chemical identity (with the exception of new end-groups). The rate of chain scission during sonication is directly proportional to the amount of chain entanglement during sonication. Chubarova et al, 2013. As a consequence, there is an intrinsic, limiting molecular weight for each polymer below which further chain scissions are unlikely to occur.

Experimentally, a plateau is observed in the plot of weight-average molecular weight ($M_w$) versus sonication time.

As a model system, linear polyacrylic acid was purchased from Scientific Polymer Products ($PAA_{SPP}$). The reported $M_w$ was 750 kg/mol, however, it was suspected a small amount of crosslinking was present, as no peak was observed in the size-exclusion chromatography (SEC) trace, suggesting that the polymer did not pass through the syringe filter (0.45 μm). Different concentrations of $PAA_{SPP}$ solutions were prepared in deionized water with sodium chloride added to reduce the viscosity. These solutions were sonicated using a 20 kHz sonication horn operating at full (100%) amplitude. Aliquots were collected at time points spanning 1-20 min. At each time point, the maximum specific energy ($w_{max}$) was calculated using the maximum power drawn from the outlet and the mass of added PAA. The $M_w$ was determined relative to polyethylene glycol/polyethylene oxide standards using SEC. Overall, the shortest fragments achievable within 20 min of sonication exhibited a $M_w$~65 kg/mol at 0.5% w/v. To achieve the necessary cohesive and holding strength for a PSA, however, the polymer should have a $M_w$>400 kg/mol. Creton, 2003; Pocious, 2012; Tobing, 2001. Considering this factor, the optimized conditions involved sonicating a 5.0% w/v solution for 15 min to give a $M_w$ of ~460 kg/mol and $w_{max}$=130 MJ/kg.

With these conditions in hand, the chain-shortening of decrosslinked $PAA_{P\&G}$ was evaluated. Surprisingly, sonicating 5% w/v solutions for up to 10 min revealed a substantially faster chain-shortening process for $PAA_{P\&G}$ compared to $PAA_{SPP}$. For example, $PAA_{P\&G}$ could be chain-shortened to a $M_w$~365 kg/mol within 5 min with a $w_{max}$ of 38 MJ/kg. This faster chain-shortening process (compared to $PAA_{SPP}$) may be due to the absence of any crosslinking. The resulting chain-shortened $PAA_{P\&G}$ fragments were then dialyzed to remove excess NaOH, and protonated using a DOWEX ion exchange resin. U.S. Provisional Patent Application No. 62/890,880, filed Aug. 23, 2019, which is incorporated herein by reference in its entirety.

1.3.3 Fischer Esterification of Polymer Fragments.

Esterifying PAA using alkyl halides has been achieved under basic conditions (i.e., tetramethylguanidine, ≥98% conversion). Li et al., 2013. This process, however, utilizes expensive solvents (i.e., DMSO and DMF) and stoichiometric quantities of base, both of which would be too costly for large-scale repurposing of waste poly(acrylic acid). In contrast, acid-catalyzed Fischer esterification using inexpensive alcohols as both the reagent and solvent is a common approach used in industry for generating acrylate monomers, Bauer, 2003; Ohara et al., 2012, which is later polymerized to the poly(acrylate). This approach, however, can lead to low yields due to the equilibrium with ester hydrolysis, Roberts and Urey, 1939; Raber et al., 1979, and catalyst deactivation with water. Liu et al., 2006. To circumvent these challenges, the water byproduct can be selectively removed or a large excess of alcohol can be employed. U.S. Pat. No. 2,917,538; Alarifi et al., 2016.

Thus, the presently disclosed subject matter aimed to develop a potentially inexpensive and scalable esterification of PAA. U.S. Provisional Patent Application No. 62/947,363, filed Dec. 12, 2019, which is incorporated herein by reference in its entirety. Without wishing to be bound to any one particular theory, it was thought that using both a hydrophobic solvent (e.g., a long chain alcohol) and a hydrophobic polymer backbone (i.e., PAA) would attenuate the negative impact of water on the esterification. To interrogate this hypothesis, conversion was measured under a series of different conditions. First, the effect of [2-ethylhexanol] was probed, using sub-stoichiometric amounts of p-toluenesulfonic acid and heating to 120° C. in sealed vials (FIG. 9). Surprisingly, high degrees of esterification were observed via $^1$H NMR and IR spectroscopy, even when using only 3 equiv. of 2-ethylhexanol (see FIG. 11 and FIG. 12). Next, the less expensive $H_2SO_4$ was used with no significant change in conversion. It initially was suspected that water was escaping from the sealed vials, driving the equilibrium towards the esterified polymer. High conversions, however, also were achieved using a Teflon-sealed pressure tube (see FIG. 13 and FIG. 14), suggesting that the generated $H_2O$ was not interfering with the conversion. To further probe the role of water, PAA was esterified with excess $H_2O$ (3 equiv) and, again, quantitative esterification was observed (see FIG. 15).

The results from these experiments demonstrate that the Fischer equilibrium lies far towards the esterification product under these reaction conditions. Without wishing to be bound to any one particular theory, it was thought that ester hydrolysis might be disfavored due to poor solvation within the hydrophobic environment created by the polymer and 2-ethylhexyl side-chains. To evaluate this hypothesis, small molecule model systems were investigated (see sections 1.7.4 and 1.7.5, herein below). First, acetic acid was reacted with ethanol for 8 h, leading to ~90% conversion to ethyl acetate (see FIG. 18 and FIG. 19, top). In a second experiment, decanoic acid was esterified with 2-ethylhexanol under analogous conditions. In this case, no unreacted carboxylic acid was detected (see FIG. 20 and FIG. 21, top). Combined, these results are consistent with the notion that hydrophobic reaction components favor esterification by excluding water. Similar results were observed when repeating these experiments in the presence of 3 equiv. of added $H_2O$ (see FIG. 18-FIG. 19 and FIG. 20-FIG. 21, bottom). From these studies, it can be concluded that the quantitative esterification of PAA results from the hydrophobic reaction environment created by the polymer backbone, the 2-ethylhexyl side chains, and the 2-ethylhexanol solvent.

To provide further support, the hydrophilicity/hydrophobicity of the local polymer environment was probed using atomistic simulations (Scheme 2 and sections 1.7.5 and 1.8, herein below). Vilseck et al., 2019; Hayes et al., 2017. Nonamers of PAA were used as a model system along with butyl alcohol. Comparison of the reaction free energies (ΔA) was made between the first esterification ($AA_9$ to $AA_8BA_1$) and the final esterification ($BA_8AA_1$ to $BA_9$). In both cases, the nonamers were solvated in a 3:1 butanol/$H_2O$ mixture to mimic the most challenging esterification conditions. The change in the Helmholtz free energy of esterification for these two steps (ΔΔA) was found to be ~0.7±0.1 kcal/mol (Scheme 2, FIG. 22). This free energy change suggests that the increase in hydrophobicity of the polymer due to partial esterification provides a small additional thermodynamic driving force towards further esterification.

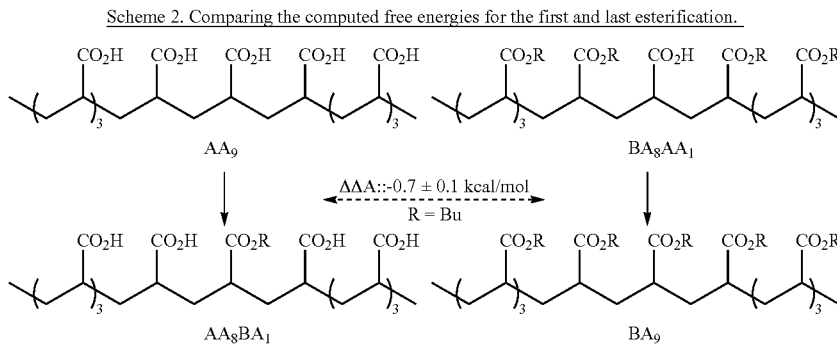

Scheme 2. Comparing the computed free energies for the first and last esterification.

1.3.4 Generating and Characterizing PSAs.

PAA fragments were first prepared with varying $M_w$ by sonicating samples of $PAA_{SPP}$ (5.0% w/v) or decrosslinked $PAA_{P\&G}$ (5.0% w/v) at three different time points (between 2-20 min). After sonication, $PAA_{P\&G}$ fragments were dialyzed with DI $H_2O$ to remove excess NaOH and protonated using DOWEX ion exchange resin. Each sample was then concentrated, freeze-dried, and ground into a fine powder, which was then treated with 2-ethylhexanol (5 equiv relative to the repeat unit) and $H_2SO_4$ (0.25 equiv) at 120° C. for 8 h. U.S. Provisional Patent Application No. 62/890,943, filed Aug. 23, 2019, which is incorporated herein by reference in its entirety. The resulting poly(2-ethylhexyl acrylate) (P(2-EHA)) was purified by precipitation, followed by drying under high vacuum. The resulting polymer $M_w$ spanned 450-1000 kg/mol for $P(2-EHA)_{SPP}$ and 700-1200 kg/mol for $P(2-EHA)_{P\&G}$, depending on the sonication time. Li et al., 2015.

The adhesive properties of the synthesized PSAs were evaluated using rheology and analyzed with respect to Chang's viscoelastic window (VW), which classifies different adhesive types. Chang, 1991. In this approach, the VW for each PSA is constructed from the dynamic storage (G') and loss (G") moduli at representative bonding and debonding frequencies of 0.01 and 100 Hz, respectively. The corresponding VW for each adhesive is the rectangular region bounded by these four moduli (FIG. 35). The G' at each frequency describes an adhesive's resistance to shear, and this term generally increases in samples with more chain entanglements (e.g., with increasing $M_w$). The G" at each frequency describes an adhesive's ability to dissipate energy. Chang noted that most existing PSAs appear between the G' and G" bounds of $10^3$ and $10^6$ Pascals (Pa) at the aforementioned bounding frequencies, and can be grouped into the quadrants (and central region) highlighted in FIG. 35. Most consumer PSA-based products are found in either quad 3 or the central region (e.g., office tape, sticky notes, bandages, and removable labels), which is signified by low-to-medium G' and G".

All the adhesives synthesized from repurposed $PAA_{P\&G}$ fall within quad 3 and the central region (FIG. 35). That is, the PSAs are soft enough to flow and wet a substrate at the bonding frequency, while hard enough to hold onto a substrate, and peel cleanly at the debonding frequency. As expected, the VWs are higher with shorter sonication times due to the higher $M_w$, and as a consequence, increase in chain entanglements. Similar results were observed with $PAA_{SPP}$. Overall, the viscoelastic properties of the synthesized PSAs suggest they would be useful for applications such as removable general-purpose adhesives, including tapes, bandages, and sticky notes.

1.3.5 Summary

In summary, the presently disclosed subject matter provides a facile, 3-step method to synthesize commercially relevant PSAs by repurposing superabsorbent poly(acrylic acid). Because this process uses waste polymer as the feedstock, it provides a more sustainable alternative to disposal in a landfill or incineration. Advantages of this approach include: (i) the fact that the chain-shortening process requires less energy than needed to synthesize acrylic acid monomer, and (ii) the quantitative esterification without needing to remove the water byproduct. The synthesized adhesives fall within the viscoelastic windows utilized in most commercial PSAs. One can target a specific window simply by varying the sonication times to form polymers with different molecular weights. Notably, these adhesives were achieved without the need for crosslinking, which is often necessary for acrylic PSAs. Overall, the sustainable nature and potential scalability of this approach should inspire alternative repurposing methods for petroleum-sourced polymers.

1.4 Materials

All chemicals were used as received unless otherwise mentioned. Polyacyrlic Acid (PAA) with molecular weight listed as 750 kg/mol ($PAA_{SPP}$) was purchased from Scientific Polymer Products. $PAA_{SIGMA1}$ (listed as 240 kg/mol), $PAA_{SIGMA2}$ (listed as 450 kg/mol), Dowex® Marathon™ MSC hydrogen form (23-27 µm), p-toluenesulfonic acid (p-TsOH), 2-ethylhexanol (2-EHOH), dimethyl sulfoxide (DMSO), sodium hydroxide, sulfuric acid, and sodium nitrate were purchased from Millipore Sigma. Methanol (MeOH) and sodium chloride (NaCl) were purchased from Fisher Scientific. Tetrahydrofuran (THF) was purchased from OmniSolv. Glacial acetic acid was purchased from Acros Organics. Deuterated solvents: Chloroform ($CDCl_3$), pyridine-d5, and deuterium oxide ($D_2O$) were purchased from Cambridge Isotopes. Sodium polyacrylate ($PAA_{P\&G}$) was provided by Procter & Gamble. Sonicated polymer fragments were dialyzed in deionized (DI) water using Spectra/Por molecular porous membrane tubing (molecular weight cut-off: 3.5 kg/mol). Pressure tube vessels were purchased from Thomas Scientific. Jacketed beakers were purchased from Sigma Aldrich (cat #: Z202738-1EA).

1.5 General Experimental and Instrumentation 1.5.1 Sonication—Sonication was performed at 100% amplitude (amp) using a Sonics and Materials Vibra-cell VCX 600 Ultrasonic Liquid Processor equipped with a 13 mm replaceable tip probe. A 3.5 cm inner diameter, 9 cm height jacketed beaker was used for all sonication procedures. Cold water (10-15° C.) was flowed through the jacket while stirring the polymer solution at 500 rpm. A thermocouple was immersed into the polymer solution to monitor temperature. The temperature was generally observed to increase to 45-50° C. from 10-15° C. during sonication. The power from the outlet was monitored using a kill-a-watt meter (#P4400). The maximum power ($P_{max}$) reading observed at the beginning of sonication was recorded. The maximum specific energy ($w_{max}$) for chain-shortening PAA of mass (m) for time (t) was determined using equation (2).

$$w_{max}(J/kg) = \frac{P_{max}(W) \times t(s)}{m(kg)} \quad (2)$$

1.5.2 NMR Spectroscopy—Unless otherwise noted, $^1$H and $^{13}$C NMR spectra for all compounds were acquired at room temperature. Chemical shift data are reported in units of δ (ppm) relative to tetramethylsilane (TMS) and referenced with residual solvent. Multiplicities are reported as follows: singlet (s), doublet (d), doublet of doublets (dd), triplet (t), quartet (q), multiplet (m), broad resonance (br). Residual water is denoted by an asterisk (*). For all $^1$H NMR spectra for polymers, a 5 s acquisition time was used with a 25 s relaxation delay in between each pulse.

1.5.3 Size Exclusion Chromatography (SEC) for $PAA_{SPP}$ and $PAA_{P\&G}$ fragments—Sonicated $PAA_{SPP}$ and $PAA_{P\&G}$ fragments were then diluted (to 1-1.5 mg/mL) with 0.1 M NaNO$_3$ (aq)/ethylene glycol (99:1 v/v) and filtered through a Titan3™ Nylon syringe filter (0.45 µm) into a SEC vial.

Polymer molecular weight (M) and dispersity (Đ) were determined by comparison with PEG/PEO EasiVial standards from Agilent at 40° C. in 0.1 M NaNO$_3$ (aq) on a Waters SEC (Waters 1515 Isocratic HPLC pump, 717plus autosampler, RI detector Model 214 and UV-PDA detector Model 487) equipped with four Ultrahydrogel columns: 120 (WAT011565), 250 (WAT011525), 500 (WAT011530) and 1000 (WAT011535).

1.5.4 SEC for polyacrylate based PSAs (pressure-sensitive adhesives)—The synthesized PSAs were dissolved (1-2 mg/mL polymer) in THF with mild heating and filtered through a PTFE filter (0.45 µm) into an SEC vial. Polymer molecular weight (M) and dispersity (Đ) were determined by comparison with poly(methyl methacrylate) ReadyCal-Kit standards from Perfect Separation Solutions at 40° C. in THF on an SEC (Waters APC PUMP and Sample manager, Waters APC RI detector serial #H$_{15}$URI545M and Wyatt uDAWN 1067UD 3-Angle light scattering detector) equipped with a Shodex HFIP-G 8B Guard Column, 2-Shodex HFIP-806M Columns (serial numbers E28T0045, E2960061, and E2910020, 7.8×300 mm in series).

1.5.5 Rheological measurements on PSAs—Rheological measurements were taken on an AR2000ex rheometer (TA Instruments) with a 25 mm serrated parallel plate. PSA (650 mg) was loaded to achieve a 1,250 µm layer thickness and measurements were taken at 25° C. The frequency sweeps were performed between 0.1 and 100 Hz.

1.6. Evaluating Polymer Recovery and Chemical Structure After Sonication

Three batches of 0.500% w/v PAA solution were prepared by dissolving $PAA_{SPP}$ (750 kg/mol, 250 mg, 3.47 mmol) with DI H$_2$O (50.0 mL each) in jacketed beakers equipped with stir bars. The PAA solutions were stirred at 300 rpm for 15 h at rt. Then, the PAA solutions were sonicated for 20 min. Next, the polymer solutions were concentrated under reduced pressure to dryness, spiked with a known amount of DMSO (1.14, 1.16, and 1.09 mmol, respectively) and redissolved with D$_2$O for quantitative $^1$H-NMR spectroscopic analysis. An average recovery of 87% was determined based on relative integrations. See FIG. 1.

TABLE 1

Average recovery after sonication determined from three trials based on amount of DMSO (mmol), normalized integration for peak a ($I_a$), mass of polymer sonicated (250 mg) and molar mass of PAA repeat unit (72.06 g/mol).

| Trial | DMSO (mmol) | $I_a$ | recovery (%) |
|---|---|---|---|
| 1 | 1.14 | 2.6 | 85 |
| 2 | 1.16 | 2.6 | 87 |
| 3 | 1.09 | 2.8 | 88 |
| Avg | | | 87 |

$$recovery(\%) = \frac{DMSO(\text{mmol}) \times I_b \times 72.06 \frac{g}{mol}}{250 \text{ mg}} \times 100 \quad (2)$$

1.7 Effect of Time and Concentration on Sonicating of $PAA_{SPP}$

Triplicate batches of $PAA_{SPP}$ solution (0.50, 1.0, and 2.5% w/v) were prepared by dissolving PAA (250, 500, and 1250 mg) with DI H$_2$O (50.0 mL each) in jacketed beakers equipped with stir bars. NaCl (100 mg, 1.71 mmol) was added to each batch to lower the solution viscosity. The PAA solutions were stirred at 300 rpm for 15 h at rt.

The 5.0% w/v sample was dissolved differently due to the need for more vigorous stirring. While stirring with a large stir bar, $PAA_{SPP}$ (7500 mg) was slowly added to a 500 mL glass bottle with DI H$_2$O (150 mL). NaCl (300 mg, 5.13 mmol) was added to lower the solution viscosity. The PAA solutions were stirred at 300 rpm for 15 h at rt. Thereafter, portions of this solution (50 mL) were transferred to jacketed beakers.

The PAA solutions were sonicated for 20 min while collecting 0.50-1.0 mL aliquots at 1, 2, 5, 10, 15, and 20 min. The aliquots were diluted (to 1-1.5 mg/mL) with 0.1 M NaNO$_3$(aq)/ethylene glycol (99:1 v/v) and analyzed via SEC. See FIG. 2.

TABLE 2

Maximum power ($P_{max}$) consumed during sonication for $PAA_{SPP}$ at 0.50% w/v.

| [PAA] (w/v %) | mass (mg) | mmol | run 1 $P_{max}$ (W) | run 2 $P_{max}$ (W) |
|---|---|---|---|---|
| 0.5 | 0.25 | 3.47 | 220 | 230 |

Maximum specific energy ($W_{max}$) values were determined using equation 2.

TABLE 3

Weight average molecular weight ($M_w$), dispersity (Đ), and specific energy ($w_{max}$) data for sonications of $PAA_{SPP}$ at 0.50% w/v.

| time (min) | run 1 $M_w$ (kg/mol) | Đ | $w_{max}$ | run 2 $M_w$ (kg/mol) | Đ | $w_{max}$ |
|---|---|---|---|---|---|---|
| 1  | 440 | 2.4 | 53   | 480 | 3.0 | 55   |
| 2  | 270 | 1.8 | 110  | 300 | 2.4 | 110  |
| 5  | 130 | 1.4 | 260  | 140 | 1.7 | 280  |
| 10 | 88  | 1.3 | 530  | 93  | 1.4 | 550  |
| 15 | 78  | 1.4 | 790  | 73  | 1.3 | 830  |
| 20 | 65  | 1.3 | 1100 | 64  | 1.3 | 1100 |

See FIG. 3.

TABLE 4

Maximum power ($P_{max}$) consumed during sonication for $PAA_{SPP}$ at 1.0% w/v.

| [PAA] (w/v %) | mass (mg) | mmol | run 1 $P_{max}$ (W) | run 2 $P_{max}$ (W) |
|---|---|---|---|---|
| 1 | 500 | 6.94 | 240 | 240 |

Maximum specific energy ($w_{max}$) values were determined using equation 2.

TABLE 5

Weight average molecular weight ($M_w$), dispersity (Đ), and specific energy ($w_{max}$) data for sonications of $PAA_{SPP}$ at 1.0% w/v.

| time (min) | run 1 $M_w$ (kg/mol) | Đ | $w_{max}$ | run 2 $M_w$ (kg/mol) | Đ | $w_{max}$ |
|---|---|---|---|---|---|---|
| 1  | 600 | 2.9 | 29  | 540 | 2.8 | 29  |
| 2  | 340 | 2.3 | 58  | 420 | 2.6 | 58  |
| 5  | 190 | 1.8 | 140 | 190 | 1.8 | 140 |
| 10 | 120 | 1.5 | 290 | 120 | 1.6 | 290 |
| 15 | 93  | 1.5 | 430 | 90  | 1.4 | 430 |
| 20 | 76  | 1.3 | 580 | 79  | 1.4 | 580 |

See FIG. 4.

TABLE 6

Maximum power ($P_{max}$) consumed during sonication for $PAA_{SPP}$ at 2.5% w/v.

| [PAA] (w/v %) | mass (mg) | mmol | run 1 $P_{max}$ (W) | run 2 $P_{max}$ (W) |
|---|---|---|---|---|
| 2.5 | 1,250 | 17.3 | 260 | 260 |

Maximum specific energy ($w_{max}$) values were determined using equation 2.

TABLE 7

Weight average molecular weight ($M_w$), dispersity (Đ), and specific energy ($w_{max}$) data for sonications of $PAA_{SPP}$ at 2.5% w/v.

| time (min) | run 1 $M_w$ (kg/mol) | Đ | $w_{max}$ | run 2 $M_w$ (kg/mol) | Đ | $w_{max}$ |
|---|---|---|---|---|---|---|
| 1  | 880 | 5.3 | 12  | 1200 | 6.1 | 12  |
| 2  | 530 | 3.7 | 25  | 550  | 3.7 | 25  |
| 5  | 250 | 2.6 | 62  | 320  | 2.5 | 62  |
| 10 | 190 | 2.2 | 125 | 210  | 2   | 125 |
| 15 | 150 | 1.9 | 187 | 150  | 2.1 | 187 |
| 20 | 120 | 1.7 | 250 | 120  | 1.9 | 250 |

See FIG. 5.

TABLE 8

Maximum power ($P_{max}$) consumed during sonication for $PAA_{SPP}$ at 5.0% w/v.

| [PAA] (w/v %) | mass (mg) | mmol | run 1 $P_{max}$ (W) | run 2 $P_{max}$ (W) |
|---|---|---|---|---|
| 5 | 2,500 | 34.6 | 290 | 280 |

Maximum specific energy ($w_{max}$) values were determined using equation 2.

TABLE 9

Weight average molecular weight ($M_w$), dispersity (Đ), and specific energy ($w_{max}$) data for sonications of $PAA_{SPP}$ at 5.0% w/v.

| time (min) | run 1 $M_w$ (kg/mol) | Đ | $w_{max}$ | run 2 $M_w$ (kg/mol) | Đ | $w_{max}$ |
|---|---|---|---|---|---|---|
| 1  | 2200 | 9.9 | 7.0 | 2600 | 8.9 | 12  |
| 2  | 1900 | 5.4 | 14  | 1900 | 6.7 | 25  |
| 5  | 1200 | 4.5 | 35  | 1200 | 4.7 | 62  |
| 10 | 730  | 2.6 | 70  | 770  | 3   | 125 |
| 15 | 470  | 2.1 | 105 | 460  | 2.2 | 187 |
| 20 | 350  | 2   | 140 | 350  | 2.2 | 250 |

See FIG. 6.

1.8 Effect of Time on Sonicating $PAA_{P\&G}$ 1.8.1 Decrosslinking—A batch of 5.0% w/v decrosslinked $PAA_{P\&G}$ solution was prepared by stirring $PAA_{P\&G}$ (10 g) in aq. NaOH (0.3 M, 200 mL) in a 500 mL glass bottle at 80° C. for 24 h.

1.8.2 Sonication—Portions of the decrosslinked $PAA_{P\&G}$ solution (50 mL) were poured into jacketed beakers equipped with stir bars. The PAA solutions were sonicated while collecting 0.50-1.0 mL aliquots at 1, 2, 3, 5, and 10 min. The aliquots were diluted with DI H$_2$O (5 mL) and dialyzed overnight in DI water to remove NaOH. The aliquots were diluted (to 1-1.5 mg/mL) with 0.1 M aq. NaNO$_3$/ethylene glycol (99:1 v/v) and analyzed via SEC. See FIG. 7.

TABLE 10

Maximum power ($P_{max}$) consumed during sonication for $PAA_{P\&G}$.

| [PAA] (w/v %) | mass (mg) | mmol | run 1 $P_{max}$ (W) | run 2 $P_{max}$ (W) |
|---|---|---|---|---|
| 5 | 2,500 | 26.6 | 320 | 320 |

Maximum specific energy ($w_{max}$) values were determined using equation 2.

TABLE 11

Weight average molecular weight ($M_w$), dispersity
(Đ) and specific energy ($w_{max}$) data for sonications
of decrosslinked $PAA_{P\&G}$ at 5.0% w/v.

| time | run 1 | | | run 2 | | |
|---|---|---|---|---|---|---|
| (min) | $M_w$ (kg/mol) | Đ | $w_{max}$ | $M_w$ (kg/mol) | Đ | $w_{max}$ |
| 0 | 2400 | 5.4 | 0 | 2500 | 5.4 | 0 |
| 1 | 1300 | 3.2 | 5.3 | 1200 | 3.2 | 5.5 |
| 2 | 790 | 2.3 | 11 | 660 | 2.2 | 11 |
| 3 | 570 | 2.2 | 16 | 560 | 2.1 | 17 |
| 5 | 390 | 1.7 | 26 | 340 | 1.8 | 28 |
| 10 | 260 | 1.7 | 53 | 270 | 1.5 | 55 |

See FIG. 8.

1.9. Chain-Shortening of PAA to Fragments for Esterification $PAA_{SIGMA1}$ and $PAA_{SIGMA2}$ were used for esterification without chain-shortening. $PAA_{SPP}$ and $PAA_{P\&G}$ were chain-shortened to shorter fragments respectively before esterification.

1.9.1 $PAA_{SPP}$—$PAA_{SPP}$ solution (5.0% w/v) was prepared by dissolving $PAA_{SPP}$ (12.5 g) with DI $H_2O$ (250 mL) in a 500 mL glass bottle equipped with a stir bar. NaCl (0.30 g, 5.13 mmol) was added to lower the solution viscosity. The PAA solution was stirred at 300 rpm for 10 h at rt, and then divided into 50 mL portions, which were sonicated in jacketed beakers for either 2, 5, 10, or 20 min. The sonicated polymer solutions were freeze-dried and ground using a mortar and pestle to achieve fine powders which were labeled $PAA_{SPP-2min}$, $PAA_{SPP-5min}$, $PAA_{SPP-10min}$, and $PAA_{SPP-20min}$, respectively. Specifically, while wearing cryogenic gloves, the freeze-dried polymer is ground with the mortar immersed in a liquid nitrogen bath. After grinding the polymer into a fine powder, the polymer is immediately (to avoid water from condensing) transferred into a vial and dried under high vacuum for 5-10 min.

1.9.2 $PAA_{P\&G}$—$PAA_{P\&G}$ solution (5.0% w/v) was prepared by adding $PAA_{P\&G}$ (10.00 g) over 5 min into a 500 mL glass bottle with aq. NaOH (300 mM, 200 mL). The solution was stirred at 80° C. for 24 h for decrosslinking. The decrosslinked $PAA_{P\&G}$ solution was divided into 50 mL portions which were sonicated in jacketed beakers for either 2, 5, or 10 min. The polymers were dialyzed to remove the NaOH using DI water (1 gallon), which was changed three times (i.e., every 3-4 h). Then, the polymer solution was protonated by passing through a column of DOWEX ion exchange resin (15-20 g). The protonated polymer solutions were freeze-dried and ground using a mortar and pestle to achieve fine powders which were labeled $PAA_{P\&G}$-2 mm, $PAA_{P\&G}$-5 mm, and $PAA_{P\&G}$-10 mm, respectively.

1.7 Fischer Esterification

In general, commercial PAAs (i.e., $PAA_{SIGMA1}$ and $PAA_{SIGMA2}$) come fine powder form and low molecular weight (<450 kg/mol) relative to the chain-shortened $PAA_{SPP}$ and $PAA_{P\&G}$. Consequently, the chain-shorted PAAs needed longer esterification time (8 h versus 3-5 h for commercial PAAs). High degrees of esterification were qualitatively confirmed when the white heterogenous reaction mixture became clear and homogenous (see FIG. 10). Recoveries were difficult to measure due to the stickiness of the synthesized adhesives.

1.7.1 Effect of Alcohol Equivalents on Conversion

Reactions were run under identical conditions except for the amounts of 2-ethylhexanol (2-EHOH) (3, 5, 10, 15 equiv.) used relative to PAA. 2-EHOH (12.6 mL, 16.7 mmol, 3.00 equiv.; 4.30 mL, 27.8 mmol, 5.0 equiv.; 8.70 mL, 55.5 mmol, 10.0 equiv.; 13.0 mL, 83.3 mmol, 15.0 equiv.) was added to separate 20 mL vials equipped with stir bars. p-TsOH (527 mg, 2.80 mmol, 0.500 equiv.) was added to each vial and stirred until dissolved. The vials were subsequently heated to 120° C., then $PAA_{SIGMA2}$ (400 mg, 5.60 mmol, 1.0 equiv.) was added. The vials were capped and stirred for 3-5 h at 120° C. Thereafter, the vials were cooled in a rt water bath. The poly(2-ethylhexyl acrylate)$_{SIGMA2}$ (P(2-EHA))$_{SIGMA2}$) was isolated by precipitating into MeOH (10 mL) and removing the supernatant. Then, the polymer was purified by dissolving in minimal amounts of THF (1 mL), precipitating into MeOH (10 mL) and removing the supernatant repeated three times. The resulting solid was dried under high vacuum at 60° C. for 3 h. See FIG. 11 and FIG. 12.

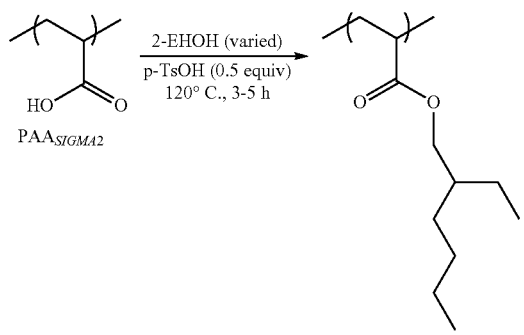

1.7.2 Effect of Water (Byproduct) on Conversion

Reactions were run under the same conditions except for equiv.alents (1.5 and 2 equiv.) of 2-EHOH used relative to PAA. To two 15 mL pressure tubes, 2-EHOH (0.980 mL, 6.24 mmol, 1.50 equiv.; 1.30 mL, 8.33 mmol, 2.00 equiv.) and $H_2SO_4$ (0.0550 mL, 1.04 mmol, 0.250 equiv.) were added and stirred at 120° C. While stirring, $PAA_{SIGMA1}$ (300 mg, 4.20 mmol, 1.0 equiv.) was subsequently added and the vessel was sealed and stirred for 3-5 h at 120° C. Thereafter, the vessels were cooled in a rt water bath. The poly(2-ethylhexyl acrylate)$_{SIGMA1}$(P(2-EHA))$_{SIGMA1}$) was isolated by precipitating into MeOH (10 mL) and removing the supernatant. Then, the polymer was purified by dissolving in minimal amounts of THF (1 mL), precipitating into MeOH (10 mL) and removing the supernatant repeated three times. The resulting solid was dried under high vacuum at 60° C. for 3 h. See FIG. 13 and FIG. 14.

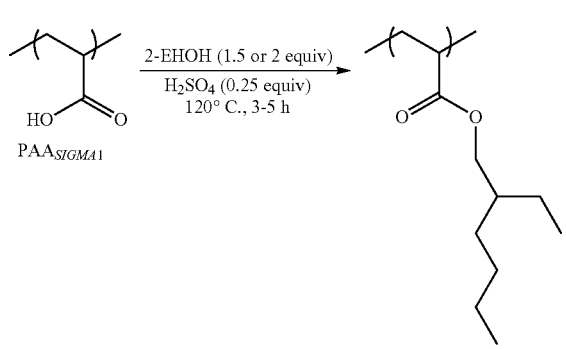

1.7.3 Effect of Adding Water on Conversion

To a 15 mL pressure tube, 2-EHOH (1.95 mL, 12.5 mmol, 3.00 equiv.), DI $H_2O$ (0.220 mL, 12.5 mmol, 3.00 equiv.)

and H$_2$SO$_4$ (0.0550 mL, 1.04 mmol, 0.250 equiv.) were added and stirred at 120° C. While stirring, PAA$_{SPP}$-20 min (300 mg, 4.20 mmol, 1.0 equiv.) was subsequently added and the vessel was sealed and stirred for 8 h at 120° C. Thereafter, the vessels were cooled in a rt water bath. The poly(2-ethylhexyl acrylate)$_{SPP-20min}$ (P(2-EHA))$_{SPP-20min}$) was isolated by precipitating into MeOH (10 mL) and removing the supernatant. Then, the polymer was purified by dissolving in minimal amounts of THF (1 mL), precipitating into MeOH (10 mL) and removing the supernatant repeated three times. The resulting solid was dried under high vacuum at 60° C. for 3 h. See FIG. 15.

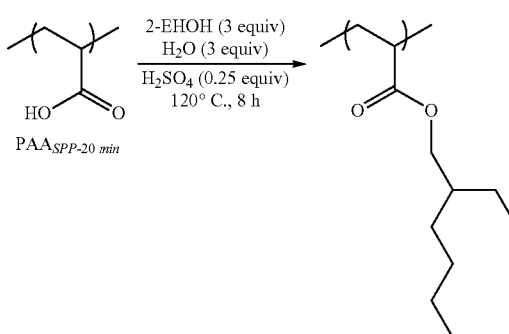

1.7.4 Effect of Adding a Second Alcohol on Conversion

To a 15 mL pressure tube, 2-EHOH (1.95 mL, 12.5 mmol, 3.00 equiv.), 3-bromopropanol (3-BrPrOH) (1.13 mL, 12.5 mmol, 3.00 equiv.), and H$_2$SO$_4$ (0.0550 mL, 1.04 mmol, 0.250 equiv.) were added and stirred at 120° C. While stirring, PAA$_{SPP-20min}$ (300 mg, 4.20 mmol, 1.0 equiv.) was subsequently added and the vessel was sealed and stirred for 8 h at 120° C. Thereafter, the vessel was cooled in a rt water bath. The poly(2-ethylhexyl acrylate-co-3-bromopropyl acrylate)$_{SPP-20min}$(P(2-EHA-co-3-BPA)$_{SPP-20min}$) was isolated by precipitating into MeOH (10 mL) and removing the supernatant. Then, the polymer was purified by dissolving in minimal amounts of THF (2 mL), precipitating into MeOH (10 mL) and removing the supernatant repeated three times. The resulting solid was dried under high vacuum at 60° C. for 3 h. See FIG. 16.

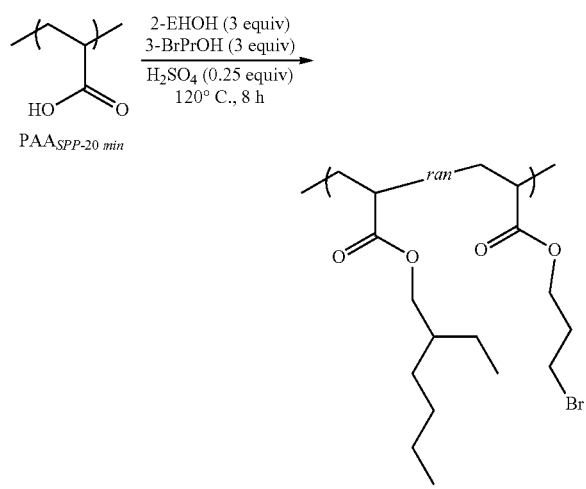

To a 15 mL pressure tube, 2-EHOH (1.95 mL, 12.5 mmol, 3.00 equiv.), EtOH (0.74 mL, 12 mmol, 3.0 equiv.) and H$_2$SO$_4$ (0.0550 mL, 1.04 mmol, 0.250 equiv.) were added and stirred at 120° C. While stirring, PAA$_{SPP-20min}$ (300 mg, 4.20 mmol, 1.0 equiv.) was subsequently added and the vessel was sealed and stirred for 8 h at 120° C. Thereafter, the vessel was placed in a water bath at rt to cool. The poly(2-ethylhexyl acrylate-co-ethyl acrylate)$_{SPP-20min}$ (P(EHA-co-EA)$_{SPP-20min}$) was isolated by precipitating into MeOH (10 mL) and removing the supernatant. Then, the polymer was purified by dissolving in minimal amounts of THF (2 mL), precipitating into MeOH (10 mL) and removing the supernatant repeated three times. The resulting solid was dried under high vacuum at 60° C. for 3 h. See FIG. 17.

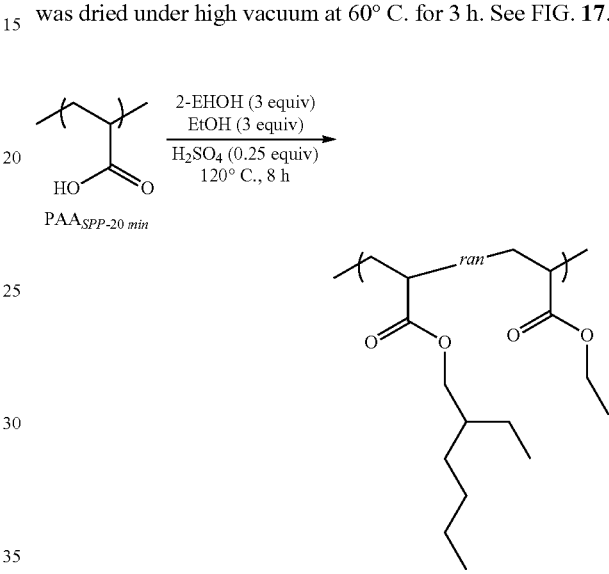

1.7.5 Effect of Adding Water on Conversion for Small Molecule Carboxylic Acids

The experiment was run in duplicate. To two 15 mL pressure tubes equipped with stir bars, EtOH (1.5 mL, 26 mmol, 5.1 equiv.), H$_2$SO$_4$ (0.0670 mL, 1.25 mmol, 0.245 equiv.) and acetic acid (0.29 mL, 5.1 mmol, 1.0 equiv.) were added. Then, DI H$_2$O (0.45 mL, 25 mmol, 4.9 equiv.) was added to one vessel and both vessels were sealed and stirred at 120° C. for 8 h. Thereafter, the vessels were cooled in a rt water bath and aliquots (0.1 mL) were diluted with 2:1 CDCl$_3$/pyridine-d5 (0.4 mL) for $^1$H NMR spectroscopic analysis. See FIG. 18 and FIG. 19.

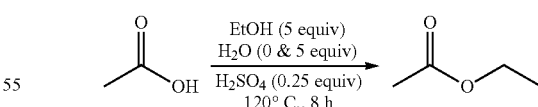

To two 15 mL pressure tubes equipped with stir bars, 2-EHOH (1.8 mL, 12 mmol, 5.2 equiv.), H$_2$SO$_4$ (0.031 mL, 0.58 mmol, 0.25 equiv.) and decanoic acid (400 mg, 2.32 mmol, 1.00 equiv.) were added. Then, DI H$_2$O (0.21 mL, 12 mmol, 5.2 equiv.) was added to one vessel and both vessels were sealed and stirred at 120° C. for 8 h. Thereafter, the vessels were cooled in a rt water bath and aliquots (0.1 mL) were diluted with 2:1 CDCl$_3$/pyridine-d5 (0.4 mL) for $^1$H NMR spectroscopic analysis. See FIG. 20.

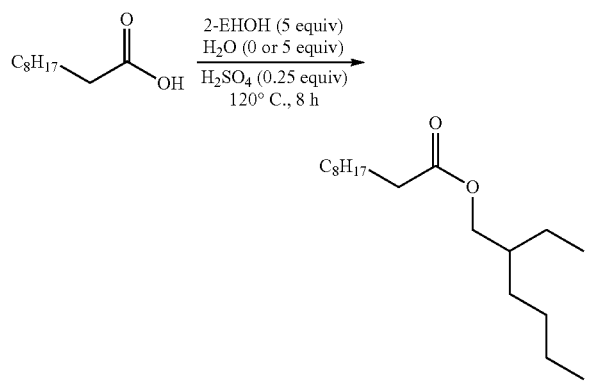

To two 15 mL pressure tubes equipped with stir bars, 2-EHOH (1.8 mL, 12 mmol, 5.0 equiv.), H$_2$SO$_4$ (0.031 mL, 0.58 mmol, 0.25 equiv.) and undecanoic acid (433 mg, 2.30 mmol, 1.0 equiv.) were added. Then, DI H$_2$O (0.21 mL, 12 mmol, 5.0 equiv.) was added to one vessel and both vessels were sealed and stirred at 120° C. for 8 h. Thereafter, the vessels were cooled in a rt water bath and aliquots (0.1 mL) were diluted with 2:1 CDCl$_3$/pyridine-d5 (0.4 mL) for $^1$H NMR spectroscopic analysis. See FIG. 21.

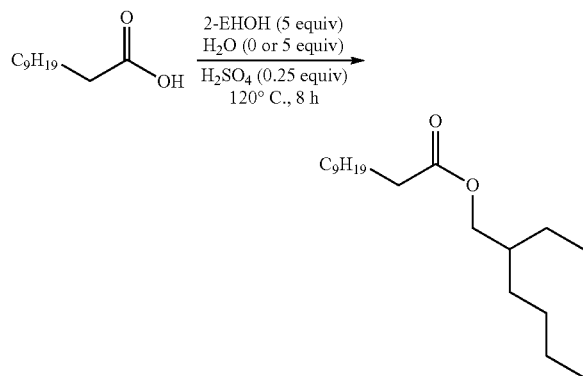

1.8 Free-Energy Calculations
1.8.1 Background on Free Energy Calculations The calculation of free-energy differences between two states is a common and widely adopted method in computational chemistry. Christ et al., 2010. To assess the difference between two states, the states must have a configurational overlap large enough for a comparison to be made. In practice, most end states do not have such an overlap, necessitating the use of bridge states that are a mix of both systems of interest. Herein the degree of perturbation is denoted as λ.

1.8.2 System Construction

Nonamers AA$_9$, BA$_8$AA$_1$, AA$_8$BA$_1$, and BA$_9$ were constructed using Avogadro, Hanwell et al., 2012, and then solvated in a 3:1 butanol:water cuboid using PACKMOL, Martinez et al., 2009, providing a 12 Å buffer between the nonamer and the edge of the cuboid. This resulted in a 41.841×44.981×45.167 Å box with 480 butanols and 160 waters for BA$_8$AA$_1$ and BA$_9$, and a 37.678×40.876×35.483 Å box with 333 butanols and 111 waters for AA$_9$ and AA$_8$BA$_1$. All of the nonamers studied were isotactic. TIP3P parameters, Jorgensen et al., 1983, were used for water, and parameters for butanol and the nonamers were derived from CGenFF, Vanommeslaeghe et al., 2009, using MATCH. Yesselman et al., 2012.

1.8.3 Molecular Dynamics

Molecular dynamics studies were performed using the CHARMM molecular mechanics platform (developmental version 44a1), Brooks et al., 2009, with the domain decomposition (DOMDEC) computational kernels on graphics processing units (GPUs). Hynninen and Growley, 2014. Molecular dynamics were performed using the canonical ensemble (NVT) at 298.15 K using a Langevin thermostat. The Leapfrog Verlet integrator was used with an integration time of 2 fs. Electrostatic interactions were modeled using a particle-mesh Ewald method, Darden and Pedersen, 1993; Essmann et al., 1995; Huang et al., 2016, with a grid spacing of 1 Å, interpolation order of 6, and a κ-value of 0.32 Å$^{-1}$. Van der Waals interactions were modelled using a 9 Å switching radius, 10 Å cutoff radius, and a 12 Å neighbor list. See FIG. 22.

1.8.4 Calculating the Difference in Free Energy of Esterification (ΔΔA)

The difference in free energy of esterification (ΔΔA) was calculated using the Multistate Bennet Acceptance Ratio method, Shirts and Chodera, 2008, using a dual topology approach. Both AA$_9$ and BA$_8$AA$_1$ were perturbed to AA$_8$BA$_1$ and BA$_9$, respectively, using 11 discrete λ states, 0→1, in steps of Δλ=0.1. Perturbation of λ, was achieved using the block module of CHARMM, λ, values held constant using the MSλD ffix keyword. Vilseck et al., 2019. Non-bonding interactions were scaled by λ using a soft-core potential. Hayes et al., 2017. Prior to molecular dynamics simulations, a system was subjected to 200 steps of steepest descent minimization. Each λ state was subjected to 200 steps of steepest descent minimization, followed by equilibration for 5 ns. Production runs consisted of 50 ns of simulation, with trajectory frames saved every 2,500 timesteps (yielding 10,000 frames total).

1.8.5 Energy Calculation Results

The free energy difference between the λ=0 and other lambda states (0.1 to 1.0) for the AA$_9$ and BA$_8$AA$_1$ systems are shown in Table 1. From the ΔA value for when κ=1 for both systems, the ΔΔA of esterification is calculated to be 0.7±0.1 kcal/mol. As the consumption of butanol and the evolution of water is expected to be identical in AA$_8$BA$_1$ and BA$_9$, the ΔA of butanol consumption and water formation during the process of esterification was ignored, as it those terms would cancel out in the calculation of ΔΔA of esterification (FIG. 1).

TABLE 12

Values for the difference in free energy between λ = 0 and other λ values for the AA$_9$ and BA$_8$AA$_1$ systems.

| λ | AA$_9$ → AA$_8$BA$_1$ ΔA relative to λ = 0 | | BA$_8$AA$_1$ → BA$_9$ ΔA relative to λ = 0 | |
| --- | --- | --- | --- | --- |
| | in k$_B$T | in kcal/mol | in k$_B$T | in kcal/mol |
| 0.0 | 0.0 ± 0.0 | 0.0 ± 0.0 | 0.0 ± 0.0 | 0.0 ± 0.0 |
| 0.1 | 22.5 ± 0.1 | 13.35 ± 0.07 | 21.2 ± 0.1 | 12.58 ± 0.06 |
| 0.2 | 36.8 ± 0.1 | 21.78 ± 0.08 | 35.1 ± 0.1 | 20.74 ± 0.06 |
| 0.3 | 48.4 ± 0.1 | 28.70 ± 0.08 | 46.4 ± 0.1 | 27.51 ± 0.06 |
| 0.4 | 58.5 ± 0.1 | 34.65 ± 0.08 | 56.4 ± 0.1 | 33.44 ± 0.06 |
| 0.5 | 67.4 ± 0.1 | 39.92 ± 0.08 | 65.4 ± 0.1 | 38.75 ± 0.06 |
| 0.6 | 75.6 ± 0.1 | 44.76 ± 0.08 | 73.7 ± 0.1 | 43.66 ± 0.06 |
| 0.7 | 83.1 ± 0.1 | 49.24 ± 0.08 | 81.4 ± 0.1 | 48.21 ± 0.06 |
| 0.8 | 90.0 ± 0.1 | 53.31 ± 0.08 | 88.4 ± 0.1 | 52.37 ± 0.06 |
| 0.9 | 96.1 ± 0.1 | 56.93 ± 0.08 | 94.7 ± 0.1 | 56.10 ± 0.06 |
| 1.0 | 101.3 ± 0.1 | 60.04 ± 0.08 | 100.2 ± 0.1 | 59.35 ± 0.06 |

1.9 Esterification Reactions to Synthesize Pressure Sensitive Adhesives 1.9.1 Esterifying PAA$_{SPP}$ fragments To a 100 mL pressure tube, 2-EHOH (8.14 mL, 52.0 mmol, 5.0 equiv.) and H$_2$SO$_4$ (0.140 mL, 2.60 mmol, 0.250 equiv.) were added and stirred at 120° C. While stirring, PAA$_{SPP-20min}$ (750 mg, 10.4 mmol, 1.0 equiv.) was subsequently added and the vessel was sealed and stirred for 8 h at 120° C. Thereafter, the vessel was cooled in a rt water bath. The poly(2-ethylhexyl acrylate)$_{SPP-20min}$ (P(2-EHA))$_{SPP-20min}$) was isolated by precipitating into MeOH (20 mL) and removing the supernatant. Then, the polymer was purified by dissolving in minimal amounts of THF (5 mL), precipitating into MeOH (20 mL) and removing the supernatant repeated three times. The resulting solid was dried under high vacuum at 60° C. for 3 h. A portion of the P(2-EHA)$_{SPP-20min}$(650 mg) was used for frequency sweep measurements. See FIG. 23-FIG. 24.

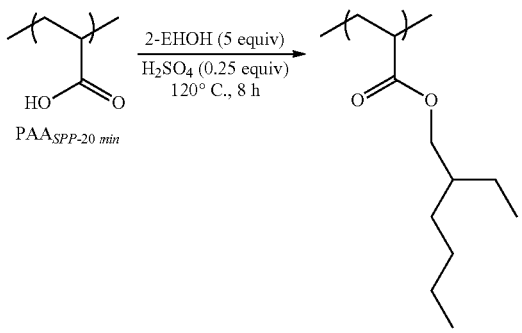

PAA$_{SPP-20\ min}$

To a 100 mL pressure tube, 2-EHOH (8.14 mL, 52.0 mmol, 5.0 equiv.) and H$_2$SO$_4$ (0.140 mL, 2.60 mmol, 0.250 equiv.) were added and stirred at 120° C. While stirring, PAA$_{SPP-10min}$(750 mg, 10.4 mmol, 1.0 equiv.) was subsequently added and the vessel was sealed and stirred for 8 h at 120° C. Thereafter, the vessel was cooled in a rt water bath. The poly(2-ethylhexyl acrylate)$_{SPP-10min}$ (P(2-EHA))$_{SPP-10min}$) was isolated by precipitating into MeOH (20 mL) and removing the supernatant. Then, the polymer was purified by dissolving in minimal amounts of THF (5 mL), precipitating into MeOH (20 mL) and removing the supernatant repeated three times. The resulting solid was dried under high vacuum at 60° C. for 3 h. A portion of the P(2-EHA)$_{SPP-10min}$(650 mg) was used for frequency sweep measurements. See FIG. 25-FIG. 26.

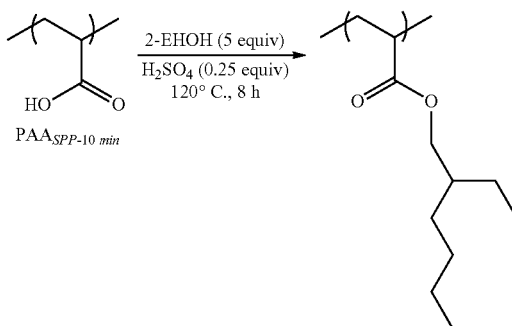

PAA$_{SPP-10\ min}$

To a 15 mL pressure tube, 2-EHOH (8.68 mL, 55.5 mmol, 5.0 equiv.) and H$_2$SO$_4$ (0.150 mL, 2.80 mmol, 0.250 equiv.) were added and stirred at 120° C. While stirring, PAA$_{SPP-2min}$(800 mg, 11.1 mmol, 1.0 equiv.) was subsequently added and the vessel was sealed and stirred for 8 h at 120° C. Thereafter, the vessel was cooled in a rt water bath. The poly(2-ethylhexyl acrylate)$_{SPP-2min}$ (P(2-EHA))$_{SPP-2min}$) was isolated by precipitating into MeOH (20 mL) and removing the supernatant. Then, the polymer was purified by dissolving in minimal amounts of THF (5 mL), precipitating into MeOH (20 mL) and removing the supernatant repeated three times. The resulting solid was dried under high vacuum at 60° C. for 3 h. A portion of the P(2-EHA)$_{SPP-2min}$(650 mg) was used for frequency sweep measurements. See FIG. 27.

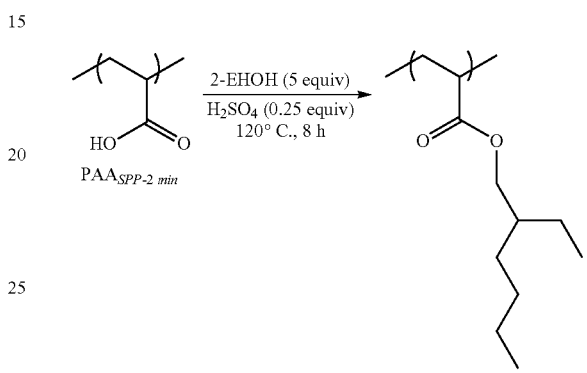

PAA$_{SPP-2\ min}$ 1.9.2 Esterifying PAA$_{P\&G}$ Fragments

To a 100 mL pressure tube, 2-EHOH (8.14 mL, 52.0 mmol, 5.0 equiv.) and H$_2$SO$_4$ (0.140 mL, 2.60 mmol, 0.250 equiv.) were added and stirred at 120° C. While stirring, P(2-EHA)$_{P\&G-10min}$(750 mg, 10.4 mmol, 1.0 equiv.) was subsequently added and the vessel was sealed and stirred for 8 h at 120° C. Thereafter, the vessel was cooled in a rt water bath. The poly(2-ethylhexyl acrylate)$_{P\&G-10min}$ (P(2-EHA))$_{P\&G-10min}$) was isolated by precipitating into MeOH (20 mL) and removing the supernatant. Then, the polymer was purified by dissolving in minimal amounts of THF (5 mL), precipitating into MeOH (20 mL) and removing the supernatant repeated three times. The resulting solid was dried under high vacuum at 60° C. for 3 h. A portion of the P(2-EHA)$_{P\&G-10min}$(650 mg) was used for frequency sweep measurements. See FIG. 29-FIG. 30.

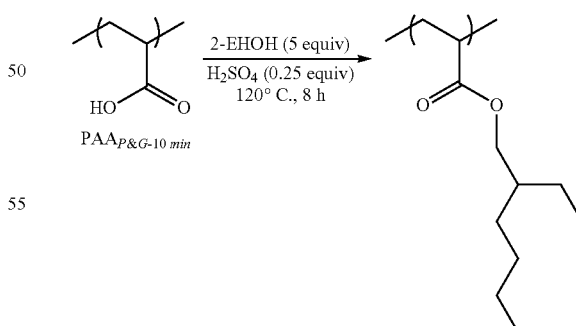

PAA$_{P\&G-10\ min}$

To a 100 mL pressure tube, 2-EHOH (8.68 mL, 55.5 mmol, 5.0 equiv.), and H$_2$SO$_4$ (0.150 mL, 2.80 mmol, 0.250 equiv.) were added and stirred at 120° C. While stirring, PAA$_{P\&G-5min}$(800 mg, 11.1 mmol, 1.0 equiv.) was subsequently added and the vessel was sealed and stirred for 8 h at 120° C. Thereafter, the vessel was cooled in a rt water bath. The poly(2-ethylhexyl acrylate)$_{P\&G-5min}$ (P(2-EHA))$_{P\&G-5min}$) was isolated by precipitating into MeOH (20 mL) and removing the supernatant. Then, the polymer was purified by dissolving in minimal amounts of THF (5 mL), precipitating into MeOH (20 mL) and removing the supernatant repeated three times. The resulting solid was dried under high vacuum at 60° C. for 3 h. A portion of the P(2-EHA)$_{P\&G-5min}$(650 mg) was used for frequency sweep measurements. See FIG. 31-FIG. 32.

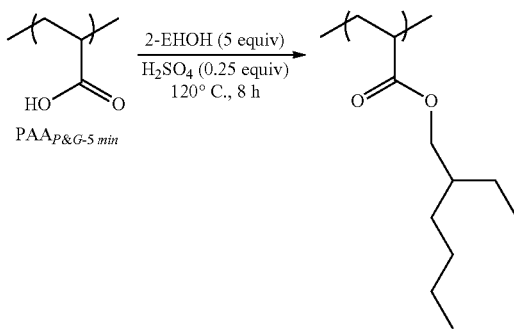

To a 100 mL pressure tube, 2-EHOH (8.68 mL, 55.5 mmol, 5.0 equiv.), and H$_2$SO$_4$ (0.150 mL, 2.80 mmol, 0.250 equiv.) were added and stirred at 120° C. While stirring, PAA$_{P\&G-2min}$(800 mg, 11.1 mmol, 1.0 equiv.) was subsequently added and the vessel was sealed and stirred for 8 h at 120° C. Thereafter, the vessel was cooled in a rt water bath. The poly(2-ethylhexyl acrylate)P&G-2 min (P(2-EHA))$_{P\&G-2min}$) was isolated by precipitating into MeOH (20 mL) and removing the supernatant. Then, the polymer was purified by dissolving in minimal amounts of THF (5 mL), precipitating into MeOH (20 mL) and removing the supernatant repeated three times. The resulting solid was dried under high vacuum at 60° C. for 3 h. A portion of the P(2-EHA)$_{P\&G-2min}$(650 mg) was used for frequency sweep measurements. See FIG. 33-FIG. 34.

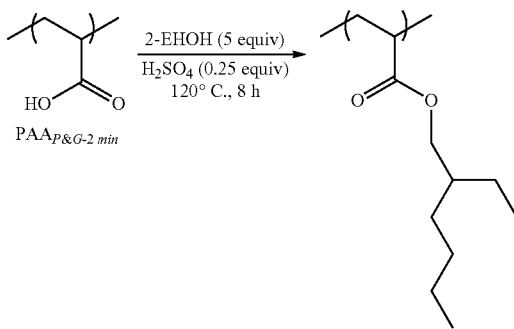

REFERENCES

All publications, patent applications, patents, and other references mentioned in the specification are indicative of the level of those skilled in the art to which the presently disclosed subject matter pertains. All publications, patent applications, patents, and other references are herein incorporated by reference to the same extent as if each individual publication, patent application, patent, and other reference was specifically and individually indicated to be incorporated by reference. It will be understood that, although a number of patent applications, patents, and other references are referred to herein, such reference does not constitute an admission that any of these documents forms part of the common general knowledge in the art.

Geyer, R.; Jambeck, J. R.; Law, K. L. Production, Use, and Fate of All Plastics Ever Made. Sci. Adv. 2017, 3, 1-6.

Advancing Sustainable Materials Management, 2017 fact sheet (EPA 530-F-19-007); United States Environmental Protection Agency (EPA)—Office of Land and Emergency Management. (5306P), 2019.

Plastics and the Environment; Andrady, A. L., Ed.; John Wiley & Sons, Inc.: Hoboken, N.J., USA, 2003.

Rochman, C. M. Microplastics Research-from Sink to Source. Science. Apr. 6, 2018, pp 28-29.

Barnes, D. K. A.; Galgani, F.; Thompson, R. C.; Barlaz, M. Accumulation and Fragmentation of Plastic Debris in Global Environments. Philos. Trans. R. Soc. B Biol. Sci. 2009, 364, 1985-1998.

Schneiderman, D. K.; Hillmyer, M. A. 50th Anniversary Perspective: There Is a Great Future in Sustainable Polymers. Macromolecules 2017, 50, 3733-3749.

Haider, T. P.; Völker, C.; Kramm, J.; Landfester, K.; Wurm, F. R. Plastics of the Future? The Impact of Biodegradable Polymers on the Environment and on Society. Angew. Chemie Int. Ed. 2019, 58, 50-62.

Zhang, X.; Fevre, M.; Jones, G. O.; Waymouth, R. M. Catalysis as an Enabling Science for Sustainable Polymers. Chem. Rev. 2018, 118, 839-885.

Vieira, M. G. A.; da Silva, M. A.; dos Santo, L. O.; Beppu, M. M. Natural-based Plasticizers and Biopolymer Films: A Review. Eur. Polym. J. 2011, 47, 254-263.

Hong, M.; Chen, E. Y.-X. Chemically Recyclable Polymers: A Circular Economy Approach to Sustainability. Green Chem. 2017, 19, 3692-3706.

Rahimi, A.; García, J. M. Chemical Recycling of Waste Plastics for New Materials Production. Nat. Rev. Chem. 2017, 1, 46.

Thiounn, T.; Smith, R. C. Advances and Approaches for Chemical Recycling of Plastic Waste. J Polym. Sci. 2020, 58, 1347-1364.

Coates, G. W.; Getzler, Y. D. Y. L. Chemical Recycling to Monomer for an Ideal, Circular Polymer Economy. Nat. Rev. Mater. 2020.

McNeill, I. C.; Sadeghi, S. M. T. Thermal Stability and Degradation Mechanisms of Poly(Acrylic Acid) and Its Salts: Part 1-Poly(Acrylic Acid). Polym. Degrad. Stab. 1990, 29, 233-246.

Lépine, L.; Gilbert, R. Thermal Degradation of Polyacrylic Acid in Dilute Aqueous Solution. Polym. Degrad. Stab. 2002, 75, 337-345.

Williamson, J. B.; Lewis, S. E.; Johnson, R. R.; Manning, I. M.; Leibfarth, F. A. C-H Functionalization of Commodity Polymers. Angew. Chemie Int. Ed. 2019, 58, 8654-8668.

Lewis, S. E.; Wilhelmy, B. E.; Leibfarth, F. A. Organocatalytic C-H Fluoroalkylation of Commodity Polymers. Polym. Chem. 2020.

Celik, G.; Kennedy, R. M.; Hackler, R. A.; Ferrandon, M.; Tennakoon, A.; Patnaik, S.; LaPointe, A. M.; Ammal, S. C.; Heyden, A.; Perras, F. A.; et al. Upcycling Single-Use Polyethylene into High-Quality Liquid Products. ACS Cent. Sci. 2019, 5, 1795-1803.

Jia, X.; Qin, C.; Friedberger, T.; Guan, Z.; Huang, Z. Efficient and Selective Degradation of Polyethylenes into Liquid Fuels and Waxes under Mild Conditions. Sci. Adv. 2016, 2, 1-8.

Future Market Insights (FMI). Super Absorbent Polymer (SAP) Market-Global Industry Analysis, Size and Forecast, 2015 to 2020. https://www.futuremarketinsights.com/reports/super-absorbent-polymer-market (accessed Mar. 21, 2020).

Creton, C. Pressure-Sensitive Adhesives: An Introductory Course. MRS Bull. 2003, 28, 434-439.

Fornof, A. R.; DiZio, J. P. Self-Wetting Adhesive Composition. U.S. Pat. No. 9,822,286. Nov. 21, 2017.

Pocious, A. V. Adhesion and Adhesives Technology, 3rd ed.; Carl Hanser Verlag: Munich, 2012.

Lehmann, A. Glacial acrylic acid (GAA), Methyl acrylate (MA), Ethyl acrylate (EA), n-Butyl acrylate (BA) and 2-Ethylhexyl acrylate (2-EHA) EABM July 15; Cefic European Basic Acrylic Monomers Sector group (EBAM): Brussels, 2015; 17.

Liang, L.; Li, C.; He, Q.; Tachea, F.; Tanjore, D.; Luong, T.; Somma, M.; D'Alessio, N.; Pray, T. R.; Sun, N. Upgrading of Postconsumer Absorbent Hygiene Products for Bioethanol Production. ACS Sustain. Chem. Eng. 2018, 6, 3589-3595.

Caruso, M. M.; Davis, D. A.; Shen, Q.; Odom, S. A.; Sottos, N. R.; White, S. R.; Moore, J. S. Mechanically-Induced Chemical Changes in Polymeric Materials. Chem. Rev. 2009, 109, 5755-5798.

Li, J.; Nagamani, C.; Moore, J. S. Polymer Mechanochemistry: From Destructive to Productive. Acc. Chem. Res. 2015, 48, 2181-2190.

Prajapat, A. L.; Gogate, P. R. Intensification of Depolymerization of Polyacrylic Acid Solution Using Different Approaches Based on Ultrasound and Solar Irradiation with Intensification Studies. Ultrason. Sonochem. 2016, 32, 290-299.

Chubarova, E. V.; Melenevskaya, E. Y.; Shamanin, V. V. Chain Degradation under Low-Intensity Sonication of Polymer Solutions in the Presence of Filler: Mechanism of Ultrasonic Degradation of Flexible Chain Macromolecules. J Macromol. Sci. Part B 2013, 52, 873-896.

Tobing, S. D.; Klein, A. Molecular Parameters and Their Relation to the Adhesive Performance of Acrylic Pressure-Sensitive Adhesives. J. Appl. Polym. Sci. 2001, 79, 2230-2244.

Collias, D. I.; Zimmerman, P. M.; Chazovachii, P. T.; Robo, M. T.; McNeil, A. J. Depolymerization of Polymers. U.S. Patent Application 62/890,880, Aug. 23, 2019.

Li, Q.; Bao, Y.; Wang, H.; Du, F.; Li, Q.; Jin, B.; Bai, R. A Facile and Highly Efficient Strategy for Esterification of Poly(Meth)Acrylic Acid with Halogenated Compounds at Room Temperature Promoted by 1,1,3,3-Tetramethylguanidine. Polym. Chem. 2013, 4, 2891-2897.

Bauer, W. Acrylic Acid and Derivatives. In Kirk-Othmer Encyclopedia of Chemical Technology; John Wiley & Sons, Inc.: Hoboken, N.J., USA, 2003.

Ohara, T.; Sato, T.; Shimizu, N.; Prescher, G.; Schwind, H.; Weiberg, O.; Marten, K.; Greim, H. Acrylic Acid and Derivatives. In Ullman's Encyclopedia of Industrial Chemistry. Wiley-VCH Verlag GmbH & Co: Weinheim, 2012.

Roberts, I.; Urey, H. C. The Mechanisms of Acid Catalyzed Ester Hydrolysis, Esterification and Oxygen Exchange of Carboxylic Acids. J. Am. Chem. Soc. 1939, 61, 2584-2587.

Raber, D. J.; Gariano, P.; Brod, A. O.; Gariano, A.; Guida, W. C.; Guida, A. R.; Herbst, M. D. Esterification of Carboxylic Acids with Trialkyloxonium Salts. J. Org. Chem. 1979, 44, 1149-1154.

Liu, Y.; Lotero, E.; Goodwin, Jr, J. G. Effect of Water on Sulfuric Acid Catalyzed Esterification. J. Mol. Catal. A 2006, 245, 132-140.

Carlyle, R. L. Process for the Production of Acrylic Acid Esters. U.S. Pat. No. 2,917,538, Dec. 15, 1959.

Alarifi, A. S.; Aouak, T. Synthesis of Acrylic or Methacrylic Acid/Acrylate or Methacrylate Ester Polymers Using Pervaporation. U.S. Pat. No. 9,321,868 B2, April 26, McNeil, A. J.; Chazovachii, R T.; Robo, M. T.; Marsh, N. G.; Zimmerman, P. M.; James, M. I.; Collias, D. I. Esterifying Polyacrylic Acid with High Conversion. U.S. Patent Application 62/947,363, Dec. 12, 2019.

Vilseck, J. Z.; Sohail, N.; Hayes, R. L.; Brooks, C. L. Overcoming Challenging Substituent Perturbations with Multisite $\lambda$-Dynamics: A Case Study Targeting $\beta$-Secretase 1. J. Phys. Chem. Lett. 2019, 10, 4875-4880.

Hayes, R. L.; Armacost, K. A.; Vilseck, J. Z.; Brooks, C. L. Adaptive Landscape Flattening Accelerates Sampling of Alchemical Space in Multisite $\lambda$, Dynamics. J. Phys. Chem. B 2017, 121, 3626-3635.

Collias, D. I.; Zimmerman, P.; Chazovachii, P. T.; Robo, M. T.; McNeil, A. J. Super Absorbent Polymer Recycling to Pressure Sensitive Adhesives. U.S. Patent Application 62/890,943, Aug. 23, 2019.

Chang, E. P. Viscoelastic Windows of Pressure-Sensitive Adhesives. J. Adhes. 1991, 34, 189-200.

Christ, C. D.; Mark, A. E.; Van Gunsteren, W. F. Basic Ingredients of Free Energy Calculations: A Review. J. Comput. Chem. 2010, 31, 1569-1582.

Hanwell, M. D.; Curtis, D. E.; Lonie, D. C.; Vandermeerschd, T.; Zurek, E.; Hutchison, G. R. Avogadro: An Advanced Semantic Chemical Editor, Visualization, and Analysis Platform. J. Cheminform. 2012, 4, 17.

Martínez, L.; Andrade, R.; Birgin, E. G.; Martinez, J. M. PACKMOL: A Package for Building Initial Configurations for Molecular Dynamics Simulations. J Comput. Chem. 2009, 30, 2157-2164.

Jorgensen, W. L.; Chandrasekhar, J.; Madura, J. D.; Impey, R. W.; Klein, M. L. Comparison of Simple Potential Functions for Simulating Liquid Water. J. Chem. Phys. 1983, 79, 926-935.

Vanommeslaeghe, K.; Hatcher, E.; Acharya, C.; Kundu, S.; Zhong, S.; Shim, J.; Darian, E.; Guvench, O.; Lopes, P.; Vorobyov, I.; Mackerell, A. D. CHARMM General Force Field: A Force Field for Drug-like Molecules Compatible with the CHARMM All-Atom Additive Biological Force Fields. J. Comput. Chem. 2009, 31, NA-NA.

Yesselman, J. D.; Price, D. J.; Knight, J. L.; Brooks, C. L. MATCH: An Atom-Typing Toolset for Molecular Mechanics Force Fields. J. Comput. Chem. 2012, 33,189-202.

Brooks, B. R.; Brooks, C. L.; Mackerell, A. D.; Nilsson, L.; Petrella, R. J.; Roux, B.; Won, Y.; Archontis, G.; Bartels, C.; Boresch, S.; Caflisch, A.; Caves, L.; Cui, Q.; Dinner, A. R.; Feig, M.; Fischer, S.; Gao, J.; Hodoscek, M.; Im, W.; Kuczera, K.; Lazaridis, T.; Ma, J.; Ovchinnikov, V.; Paci, E.; Pastor, R. W.; Post, C. B.; Pu, J. Z.; Schaefer, M.; Tidor, B.; Venable, R. M.; Woodcock, H. L.; Wu, X.; Yang, W.; York, D. M.; Karplus, M. CHARMM: The Biomolecular Simulation Program. J. Comput. Chem. 2009, 30, 1545-1614.

Hynninen, A.-P.; Crowley, M. F. New Faster CHARMM Molecular Dynamics Engine. J. Comput. Chem. 2014, 35, 406-413.

Darden, T.; York, D.; Pedersen, L. Particle Mesh Ewald: An N·log(N) Method for Ewald Sums in Large Systems. J. Chem. Phys. 1993, 98, 10089-10092.

Essmann, U.; Perera, L.; Berkowitz, M. L.; Darden, T.; Lee, H.; Pedersen, L. G. A Smooth Particle Mesh Ewald Method. *J. Chem. Phys.* 1995, 103, 8577-8593.

Huang, Y.; Chen, W.; Wallace, J. A.; Shen, J. All-Atom Continuous Constant PH Molecular Dynamics with Particle Mesh Ewald and Titratable Water. *J. Chem. Theory Comput.* 2016, 12, 5411-5421.

Shirts, M. R.; Chodera, J. D. Statistically Optimal Analysis of Samples from Multiple Equilibrium States. *J. Chem. Phys.* 2008, 129, 124105.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A method for preparing a pressure sensitive adhesive from one or more sodium polyacrylate-based superabsorbent polymers, the method comprising:
   (a) providing a solution comprising one or more sodium polyacrylate-based superabsorbent polymers;
   (b) decrosslinking the one or more sodium polyacrylate-based superabsorbent polymers to provide one or more decrosslinked sodium poly acrylate-based superabsorbent polymers;
   (c) optionally sonicating the one or more decrosslinked sodium polyacrylate-based superabsorbent polymers to provide one or more chain-shortened sodium polyacrylate-based superabsorbent polymers;
   (d) protonating the one or more decrosslinked and/or chain-shortened sodium polyacrylate-based superabsorbent polymers to provide one or more protonated decrosslinked and/or chain-shortened polyacrylic acid-based superabsorbent polymers; and
   (e) esterifying the one or more protonated decrosslinked and/or chain-shortened polyacrylic acid-based superabsorbent polymers to provide a pressure sensitive adhesive.

2. The method of claim 1, wherein the one or more sodium polyacrylate-based superabsorbent polymers are derived from a disposable personal hygiene product.

3. The method of claim 1, wherein the decrosslinking of the one or more sodium polyacrylate-based superabsorbent polymers comprises contacting the one or more sodium polyacrylate-based superabsorbent polymers with a base to provide one or more decrosslinked sodium polyacrylate-based superabsorbent polymers.

4. The method of claim 3, wherein the base is an inorganic base.

5. The method of claim 4, wherein the inorganic base is selected from the group consisting of NaOH, KOH, $Na_2CO_3$, and $K_2CO_3$.

6. The method of claim 1, wherein the protonating of the one or more decrosslinked sodium polyacrylate-based superabsorbent polymers comprises (i) contacting the one or more decrosslinked sodium polyacrylate-based superabsorbent polymers with a cation exchange resin or (ii) titrating the one or more decrosslinked sodium polyacrylate-based superabsorbent polymers with HCL or $H_2SO_4$ to provide one or more protonated polyacrylic add-based superabsorbent polymers.

7. The method of claim 1, wherein the esterifying of the one or more protonated polyacrylic acid-based superabsorbent polymers comprises contacting the one or more protonated polyacrylic acid-based superabsorbent polymers with one or more organohalide compounds.

8. The method of claim 7, wherein the one or more organohalide compounds is selected from the group consisting of methyl iodide, ethyl iodide, n-butyl bromide, n-octyl bromide, propargyl bromide (3-bromo-1-propyne), ethyl bromoacetate, ethyl chloroacetate, (1-bromoethyl)benzene, benzyl chloride, benzyl bromide, isobutenyl chloride (3-chloro-2-methylprop-1-ene), 2-ethylhexylbromide, and 2-ethylhexylchloride.

9. The method of claim 1, wherein the esterifying of the one or more protonated polyacrylic acid-based superabsorbent polymers comprises contacting the one or more protonated polyacrylic acid-based superabsorbent polymers with one or more promoters.

10. The method of claim 9, wherein the one or more promoters is selected from the group consisting of 1,1,3,3-tetramethylguanidine (TMG), triethylamine, and pyridine.

11. The method of claim 1, wherein the esterifying of the one or more protonated polyacrylic acid-based superabsorbent polymers is done in a polar aprotic solvent.

12. A method for preparing a pressure sensitive adhesive from one or more sodium polyacrylate-based superabsorbent polymers, the method comprising:
   (a) providing one or more sodium polyacrylate-based superabsorbent polymers; and
   (b) contacting the one or more sodium polyacrylate-based superabsorbent polymers with one or more alcohols in the presence of an acid for a period of time at a predetermined temperature to provide a pressure sensitive adhesive.

13. The method of claim 12, wherein the one or more sodium polyacrylate-based superabsorbent polymers are derived from a disposable personal hygiene product.

14. The method of claim 12, wherein the one or more alcohols is selected from the group consisting of 2-ethylhexanol, 3-bromopropanol, and combinations thereof.

15. The method of claim 12, wherein the one or more alcohols is selected from 2-ethylhexanol, 3-bromopropanol, and combinations thereof.

16. The method of claim 12, wherein the acid is selected from the group consisting of tosylic acid and sulfuric acid.

17. The method of claim 12, wherein the one or more alcohols is present in about a 1:2 ratio relative to an acrylic acid repeat unit of the one or more sodium poly acrylate-based superabsorbent polymers.

18. The method of claim 12, wherein the one or more alcohols is present in about a 1:1 ratio relative to an amount of water.

19. The method of claim 12, wherein the method does not require a step of removing water.

\* \* \* \* \*